US012021467B2

(12) United States Patent
Popov et al.

(10) Patent No.: US 12,021,467 B2
(45) Date of Patent: Jun. 25, 2024

(54) RELUCTANCE SYNCHRONOUS MACHINES WITHOUT PERMANENT MAGNETS

(71) Applicant: Linear Labs, Inc., Fort Worth, TX (US)

(72) Inventors: Andrei Popov, Azle, TX (US); Michael Van Steenburg, Fort Worth, TX (US); Fred Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 155 days.

(21) Appl. No.: 17/562,669

(22) Filed: Dec. 27, 2021

(65) Prior Publication Data

US 2022/0123681 A1 Apr. 21, 2022

Related U.S. Application Data

(63) Continuation of application No. PCT/US2020/039973, filed on Jun. 26, 2020.

(60) Provisional application No. 62/867,189, filed on Jun. 26, 2019.

(51) Int. Cl.
| | |
|---|---|
| *H02K 1/14* | (2006.01) |
| *H02K 1/27* | (2022.01) |
| *H02K 16/02* | (2006.01) |
| *H02K 17/16* | (2006.01) |
| *H02K 19/10* | (2006.01) |
| *H02K 21/26* | (2006.01) |
| *H02P 25/08* | (2016.01) |

(52) U.S. Cl.
CPC ............. *H02P 25/08* (2013.01); *H02K 1/145* (2013.01); *H02K 1/27* (2013.01); *H02K 16/02* (2013.01); *H02K 17/165* (2013.01); *H02K 19/103* (2013.01); *H02K 21/26* (2013.01); *H02K 2201/12* (2013.01)

(58) Field of Classification Search
CPC ............. H02K 1/27; H02K 21/26; H02P 6/17
See application file for complete search history.

(56) References Cited

U.S. PATENT DOCUMENTS

| | | | |
|---|---|---|---|
| 2010/0019606 A1* | 1/2010 | Mizutani | H02K 21/046 310/181 |
| 2010/0123426 A1* | 5/2010 | Nashiki | H02K 1/146 310/46 |
| 2019/0356251 A1* | 11/2019 | Hunstable | H02P 6/17 |

* cited by examiner

*Primary Examiner* — Cortez M Cook
(74) *Attorney, Agent, or Firm* — Run8 Patent Group, LLC; Peter Miller; Alexander Rodriguez

(57) ABSTRACT

Disclosed are various embodiments for reluctance synchronous machines having a rotor comprising a plurality of rotor core assemblies configured to form a reluctance torque tunnel having at least a first reluctance tunnel segment and a second reluctance tunnel segment and a stator having a plurality of coils configured to form a coil winding assembly, the coil winding assembly positioned within the reluctance torque tunnel, such that at least one of the plurality of coils is surrounded by the first reluctance tunnel segment or the second reluctance tunnel segment, alternatively the rotor may be the coil winding assembly and the stator may be the reluctance torque tunnel.

20 Claims, 20 Drawing Sheets

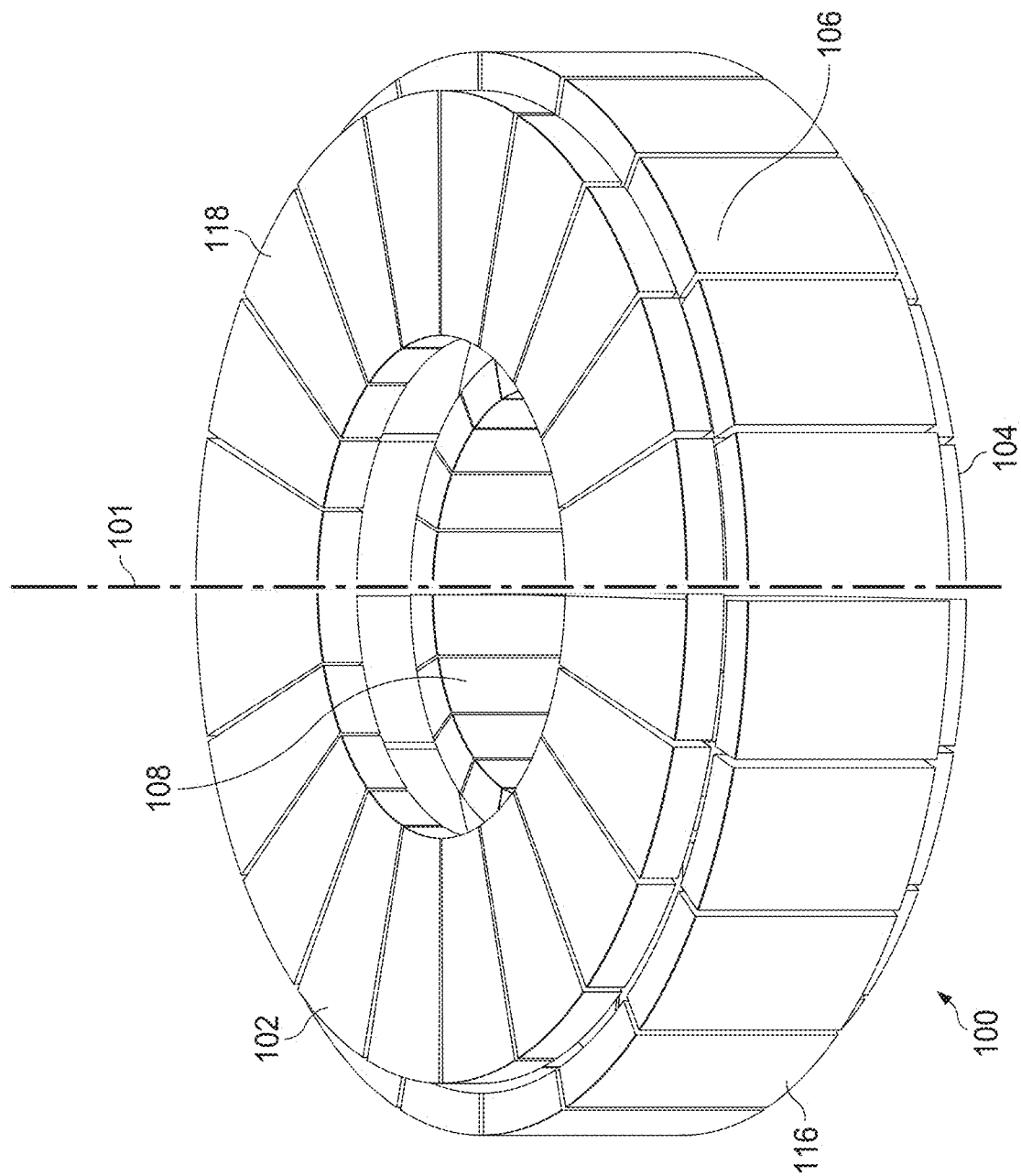
Fig. 1B1

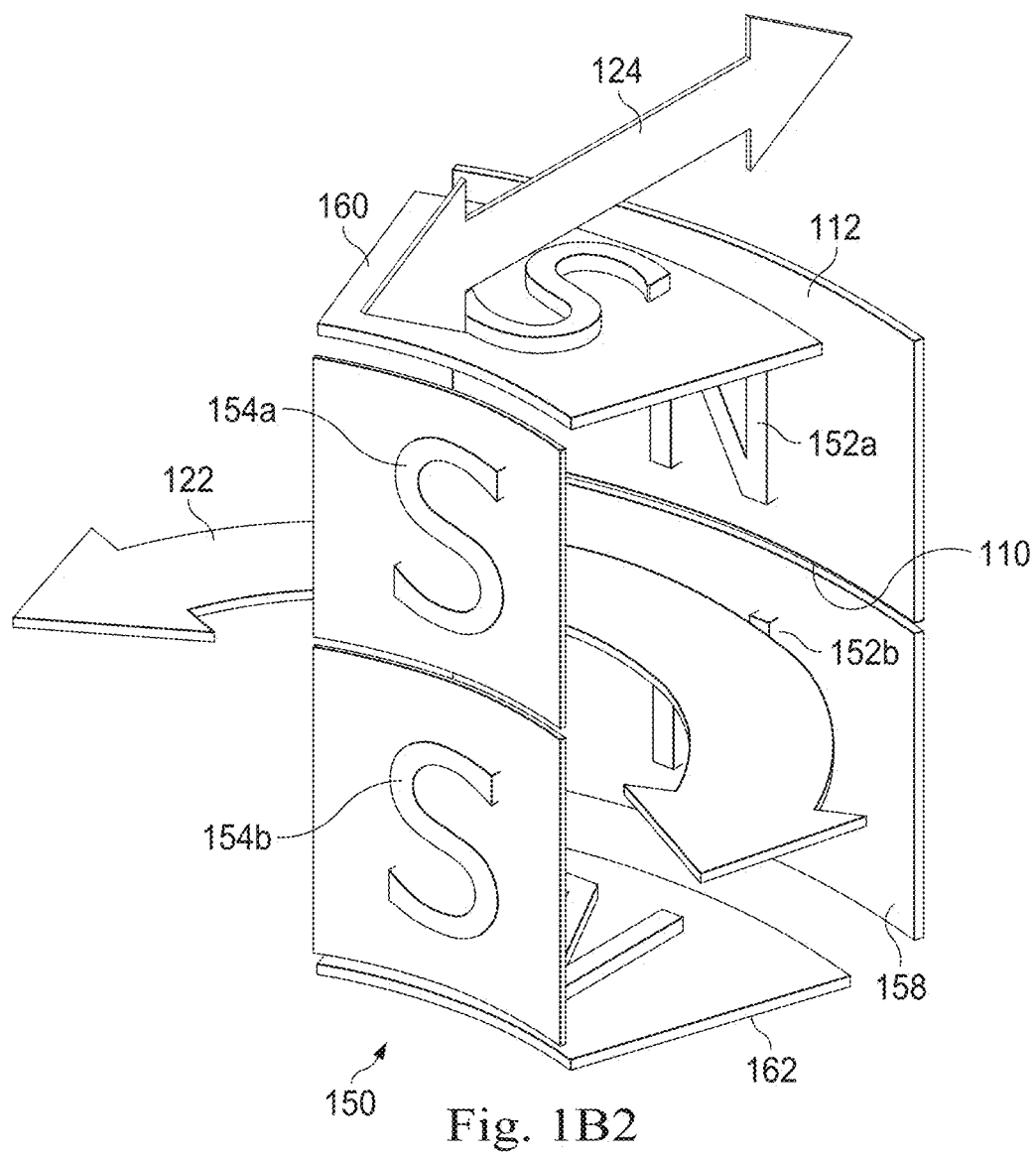
Fig. 1B2

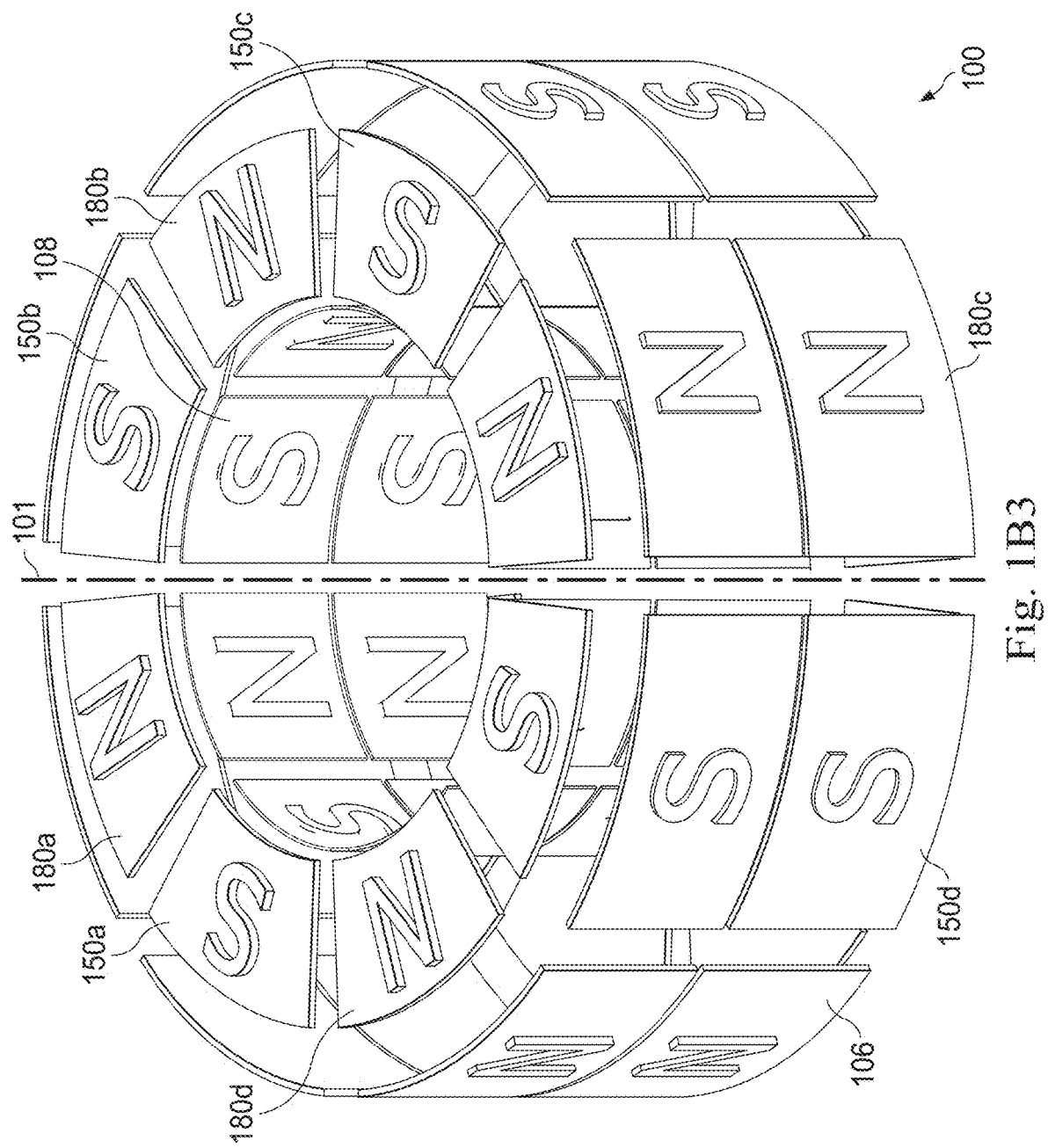
Fig. 1B3

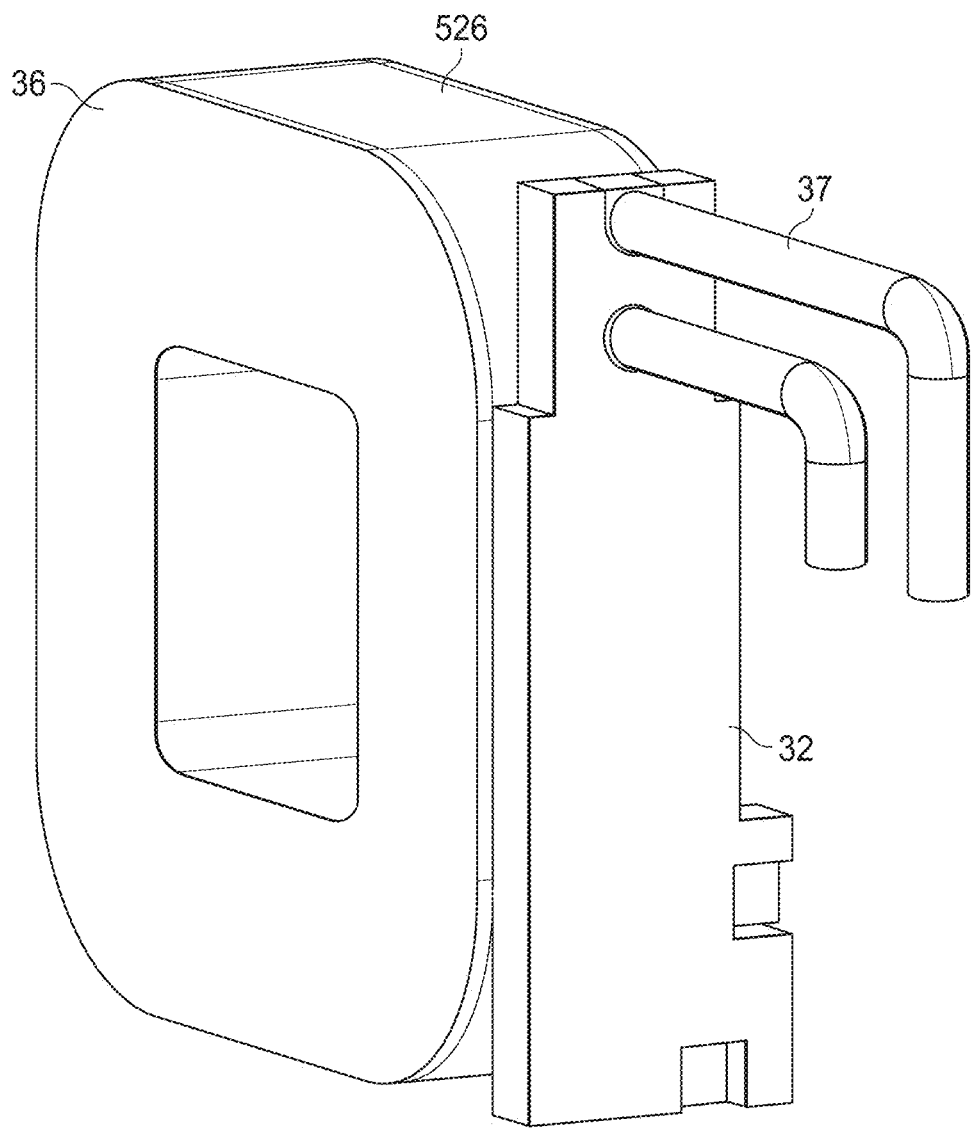
Fig. 1C1

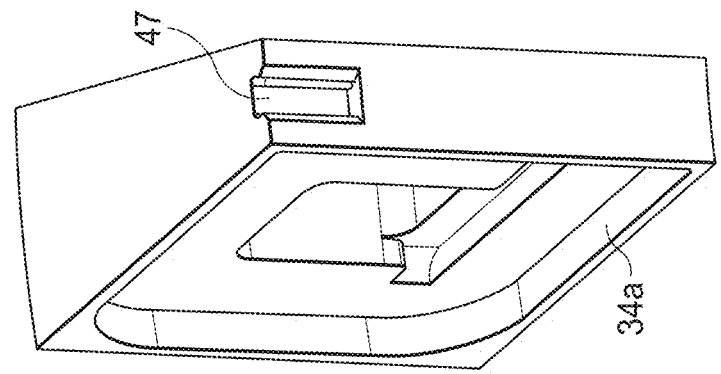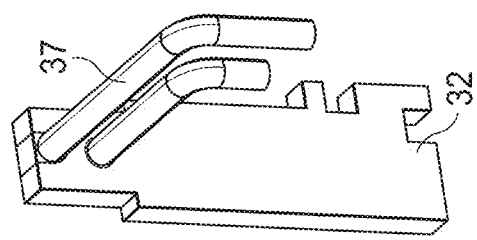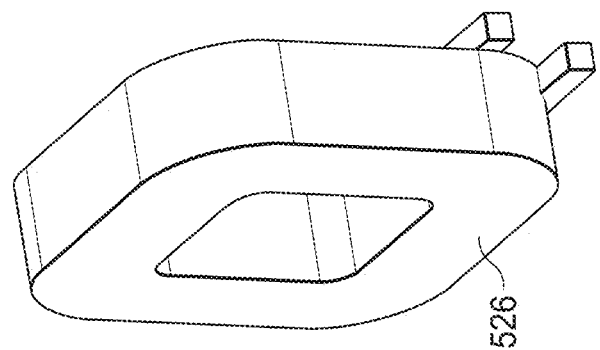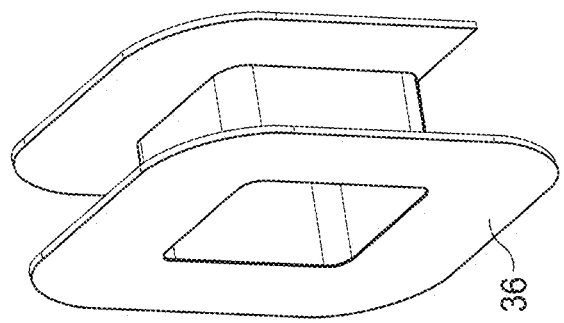
Fig. 1C2

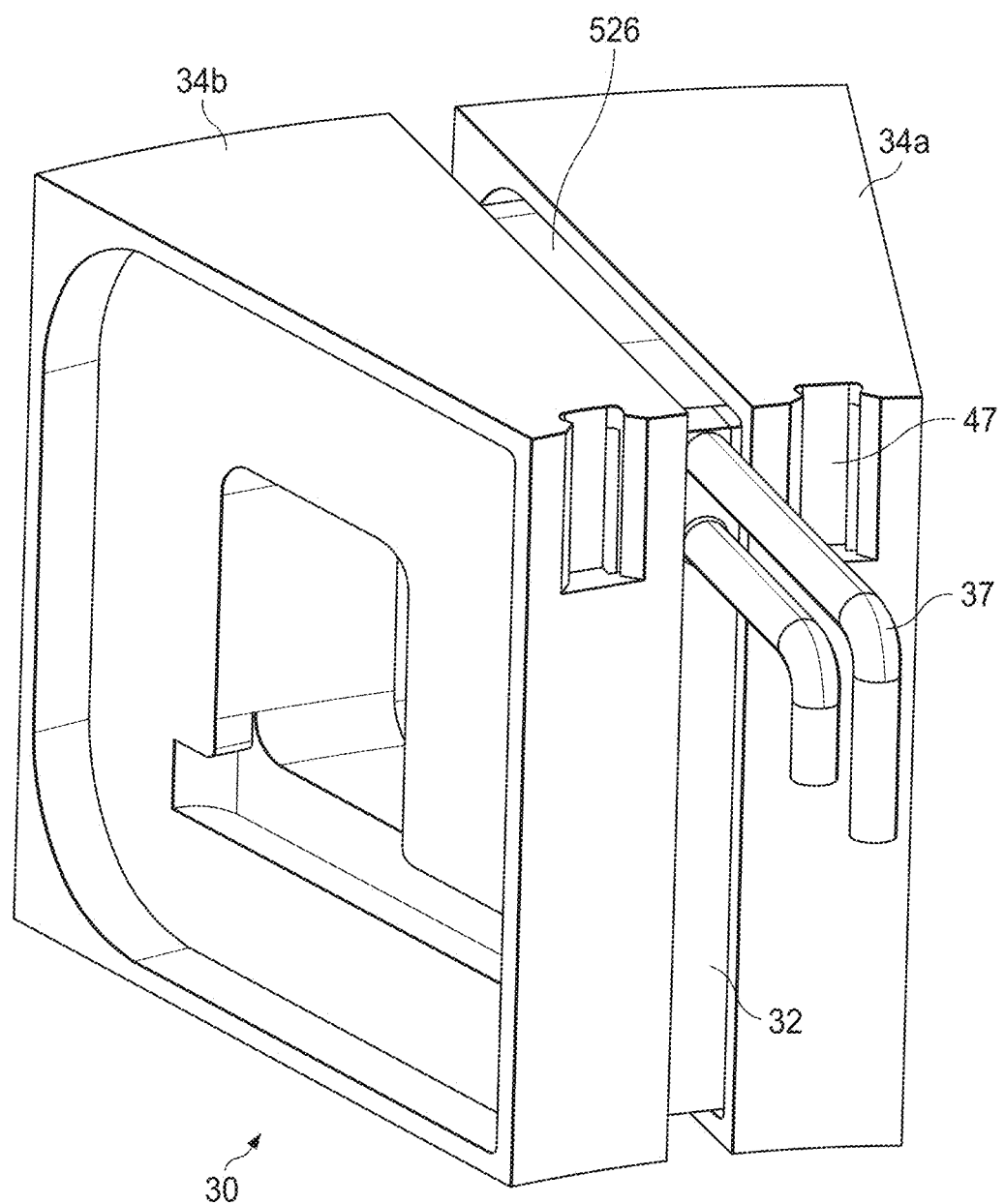
Fig. 1C3

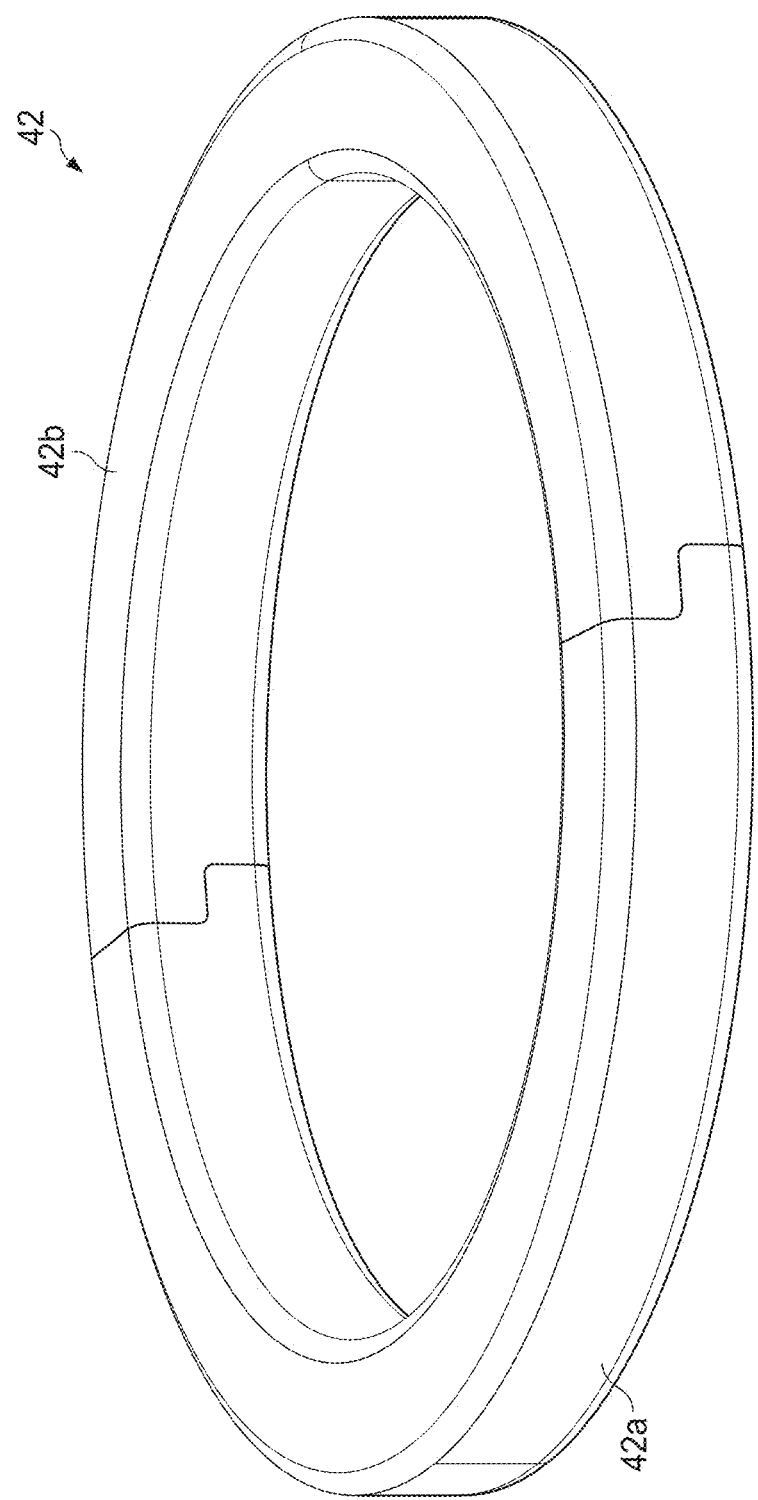

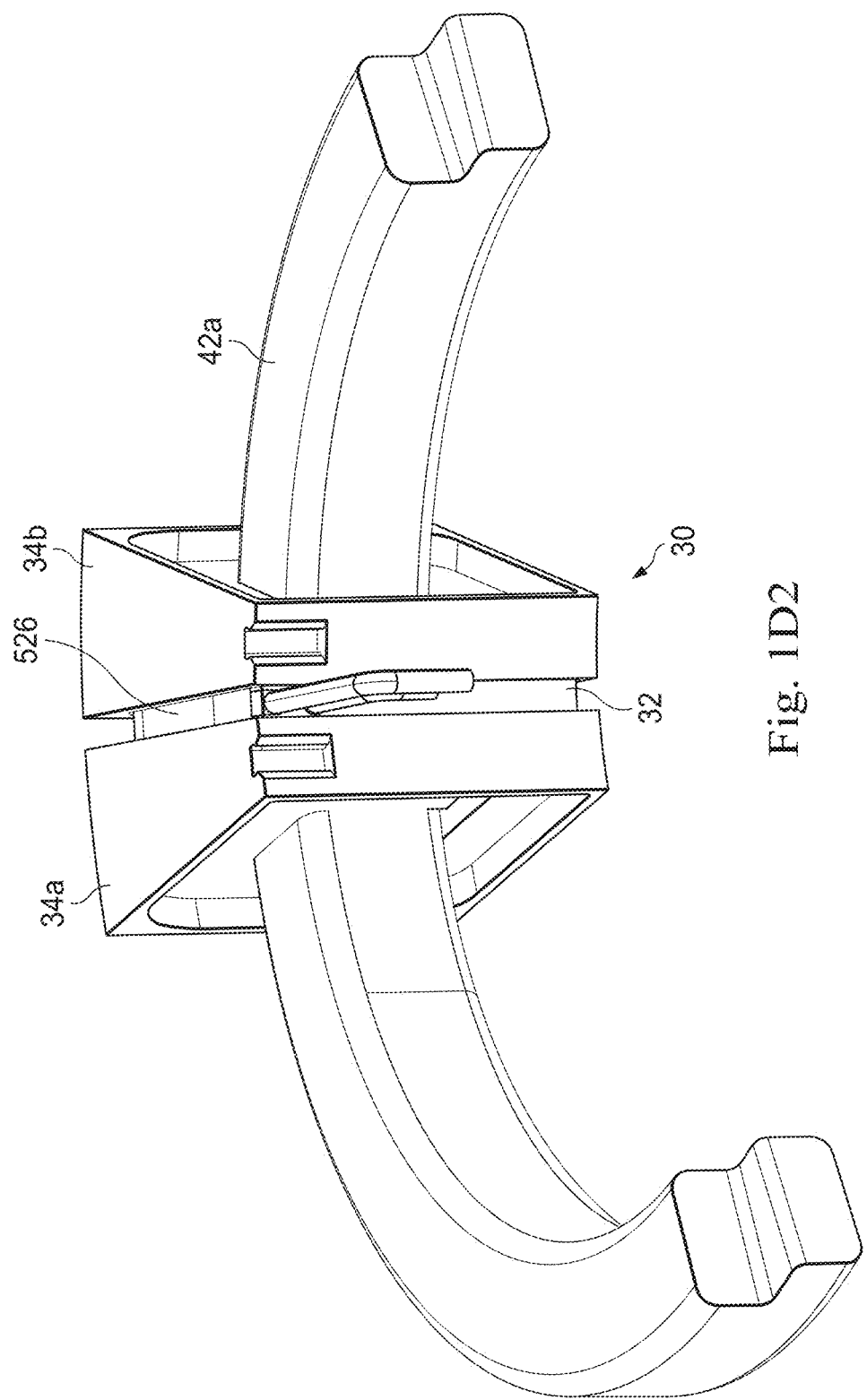
Fig. 1D2

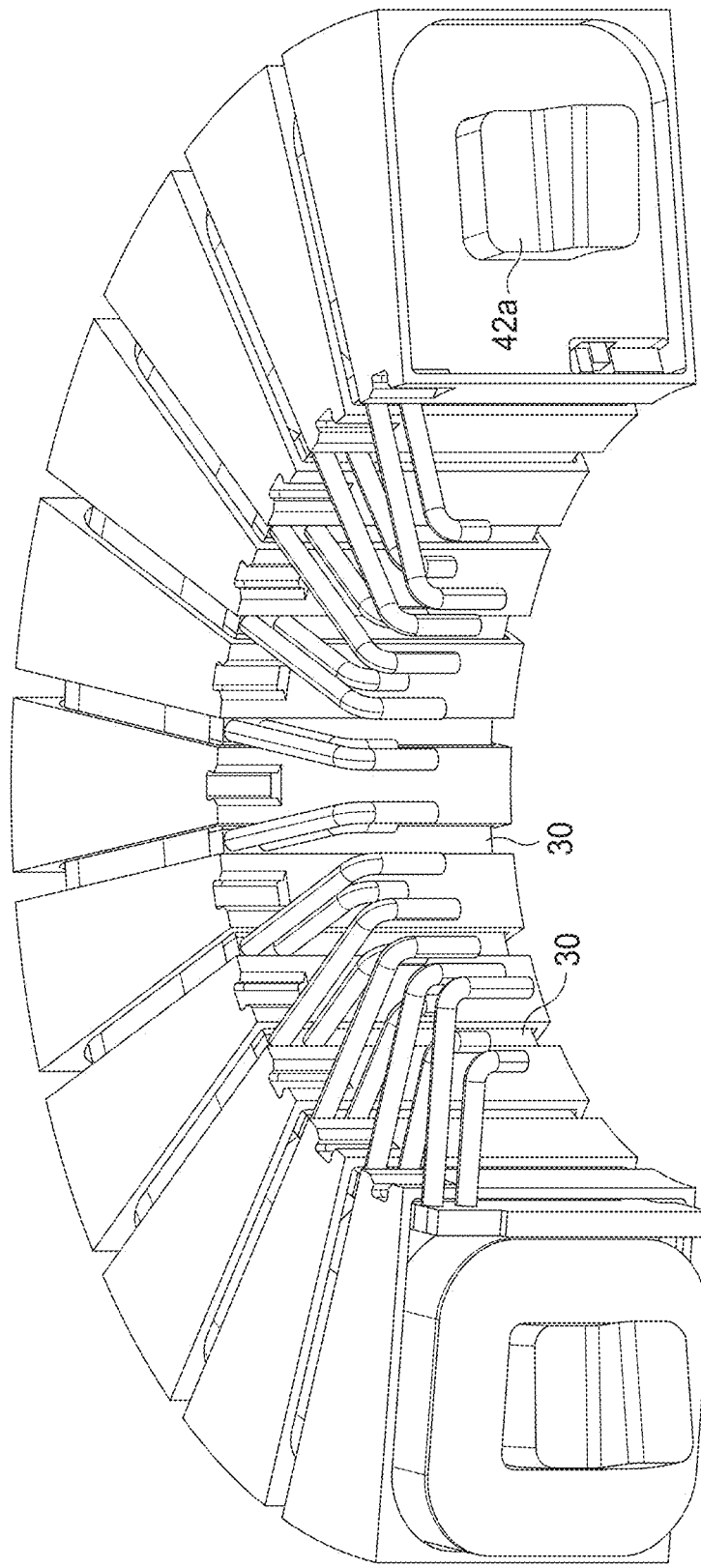
Fig. 1D3

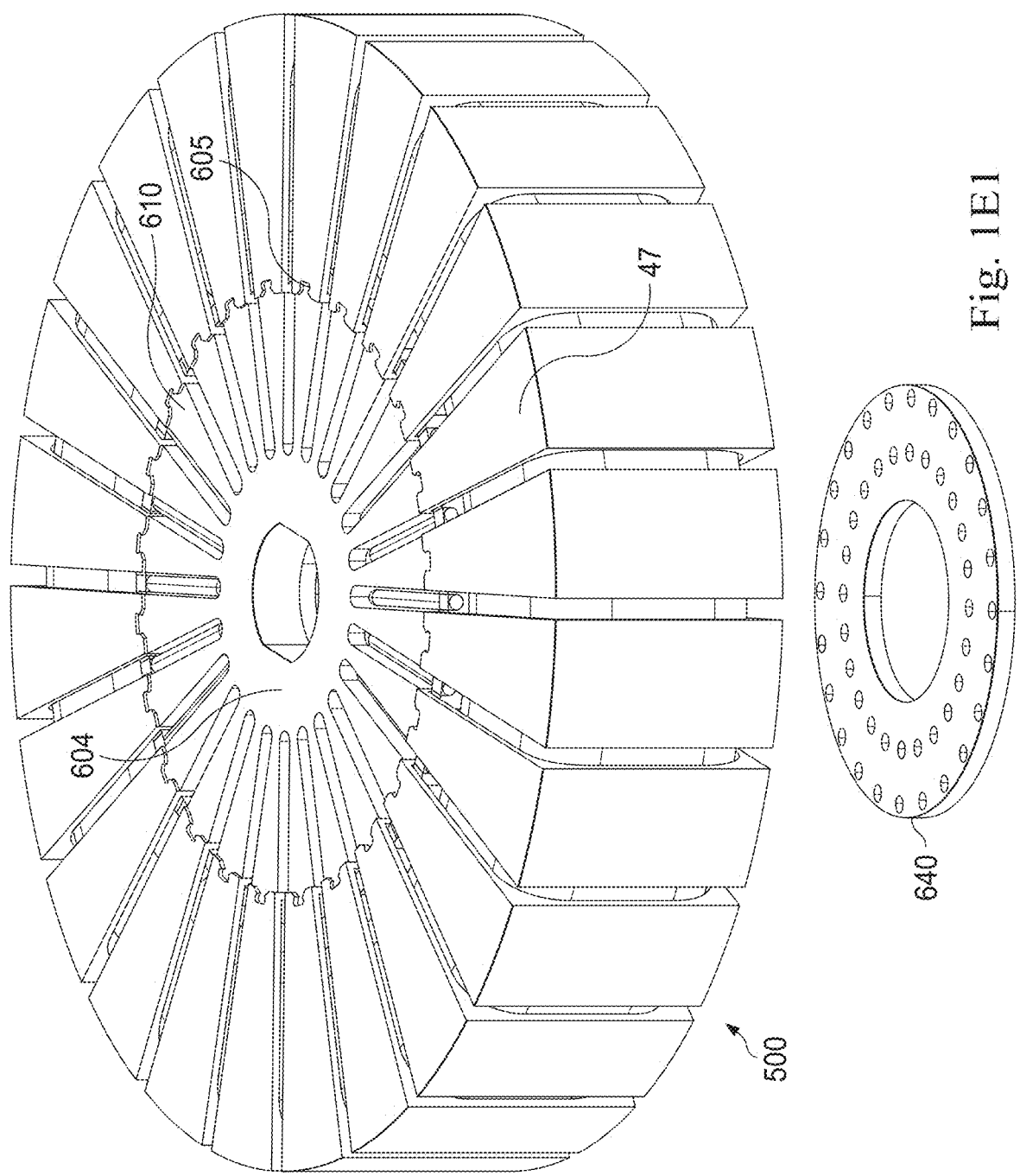
Fig. 1E1

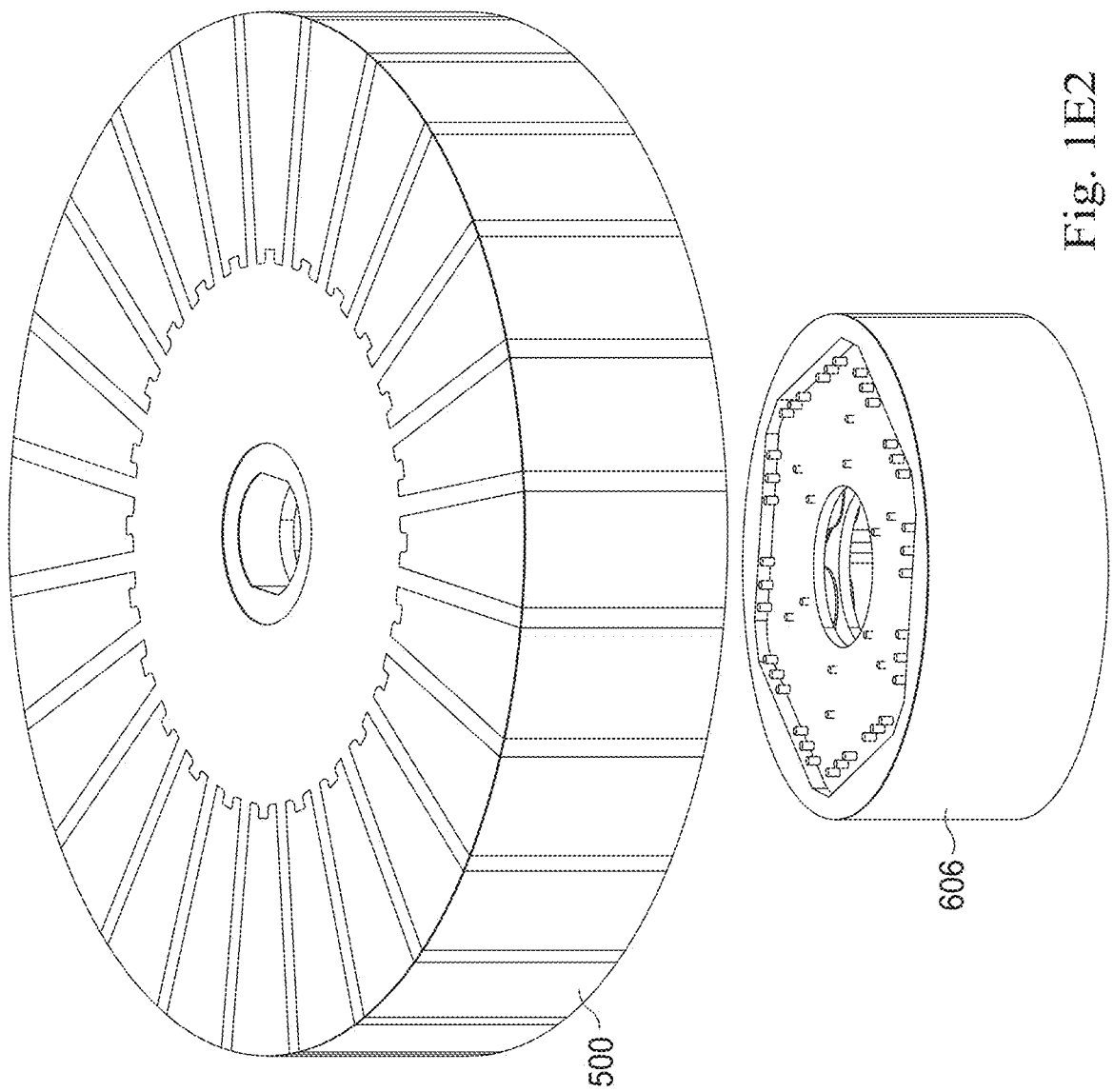

RELUCTANCE SYNCHRONOUS MACHINES WITHOUT PERMANENT MAGNETS

RELATED APPLICATIONS

This application is a continuation of PCT Application No. PCT/US2020/039973 entitled "RELUCTANCE SYNCHRONOUS MACHINES WITHOUT PERMANENT MAGNETS," filed on Jun. 26, 2020, which claims priority to U.S. Application No. 62/867,189 entitled "ELECTRIC MOTORS WITHOUT PERMANENT MAGNETS," filed on Jun. 26, 2019. The disclosures of both are hereby incorporated by reference for all purposes.

This application is also commonly owned with the following U.S. patent applications: U.S. application No. 62/185,637 entitled "An Improved Electric Motor/Generator," filed on Jun. 28, 2015, U.S. application Ser. No. 15/008,431 entitled "An Improved Multi-Tunnel Electric Motor Generator," filed on Jan. 27, 2016, PCT Application number PCT/US15/26776, entitled "AN IMPROVED MULTI-TUNNEL ELECTRIC MOTOR/GENERATOR" filed on Apr. 8, 2016, U.S. patent application Ser. No. "14/866,788, entitled "An Improved Brushless Electric Motor/Generator," filed on Sep. 25, 2015; U.S. patent application Ser. No. "14/866,787, entitled "An Improved Brushed Electric Motor/Generator," filed on Sep. 25, 2015; U.S. application Ser. No. 14/608,232, entitled "An Improved Brushless Electric Motor/Generator," filed on Jan. 29, 2015; and U.S. application Ser. No. 13/848,048, entitled "An Improved DC Electric Motor/Generator with Enhanced Permanent Magnetic Flux Densities" filed on Mar. 20, 2013, the disclosures of which are hereby incorporated by reference for all purposes.

TECHNICAL FIELD

The invention relates in general to new and improved electric motors and generators, or electric machines for producing rotary motion or generating electrical power from rotary motion input and in particular, to electric machines which do not use permanent magnets.

BACKGROUND INFORMATION

Electric motors use electrical energy to produce mechanical energy, typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. In a conventional electric motor, a central core (commonly known as the rotor) of tightly wrapped current carrying material creates magnetic poles which rotate at high speed between the fixed poles of a magnet (commonly known as the stator) when an electric current is applied. The central core is normally coupled to a shaft which rotates with the rotor. The shaft may be used to drive gears and wheels in a rotary machine or convert rotational motion into motion in a straight line. With conventional electric motors a pulsed electrical current of sufficient magnitude must be applied to produce a given torque or horsepower output.

Generators are usually based on the principle of electromagnetic induction, which was discovered by Michael Faraday in 1831. Faraday discovered that when an electrical conducting material, such as coils of copper wire, are moved through a magnetic field, or vice versa, an electric current will begin to flow through that moving conducting material. In this situation, the coils of wire are called the armature, because they are moving with respect to the stationary magnets, which are called the stator. Typically, the moving component is called the rotor or armature and the stationary components are called the stator. The power generated is a function of flux strength, conductor size, number of pole pieces, and motor speed in revolutions per minute (RPM).

In motors or generators, some form of energy drives the rotation of the rotor. As energy becomes scarcer and more expensive, what is needed are more efficient motors and generators to reduce energy consumption and hence reduce costs. Further, China currently dominates the supply of rare earth metals and in the past has threatened to stop exporting rare earth material as part of on-going trade negotiations with the U.S.

SUMMARY

In response to this and other problems, this patent application is an expansion of previous patents and patent applications that discussed using methods and systems of increasing flux density in asynchronous and synchronous motor/generators by using multiple magnetic torque tunnels, further modified so that they can function without the use of permanent magnets. Such motors include embodiments for switched reluctance motors (SRM), induction motors (IM), reluctance synchronous motors (RSM), and the like.

These and other features, and advantages, will be more clearly understood from the following detailed description taken in conjunction with the accompanying drawings.

BRIEF DESCRIPTION OF THE DRAWINGS

FIG. 1B1 is a detailed isometric view of one embodiment of an assembled magnetic toroidal cylinder or magnetic disk of FIG. 1A.

FIG. 1B2 is a detailed isometric view illustrating one embodiment of a magnetic tunnel segment of the magnetic toroidal cylinder.

FIG. 1B2 is a detailed isometric view illustrating one embodiment of a magnetic tunnel segment of the magnetic toroidal cylinder.

FIG. 1B3 is a detailed view illustrating one embodiment of a magnetic toroidal cylinder showing the magnetic pole orientation of the individual magnetic segments.

FIG. 1C1 is a detailed isometric view of a power or coil module.

FIG. 1C2 is a detailed exploded isometric view of the primary components comprising the coil module of FIG. 1C1.

FIG. 1C3 is an isometric view of a coil module sandwiched between two pole portions.

FIG. 1D1 is an isometric view of a central core or yoke for a coil winding assembly.

FIG. 1D2 is an isometric view of a coil module positioned about a portion of the central core.

FIG. 1D3 is an isometric view of the central core portion of FIG. 1D2 illustrating additional coil modules positioned about the central core portion.

FIG. 1E1 is an isometric view of a coil winding assembly formed by joining the core portion illustrated in FIG. 1D3 with another core portion also having a full complement of coil modules and a spider.

FIG. 1E2 is an isometric exploded view of the assembled coil module after potting and a brushless motor controller.

DETAILED DESCRIPTION

Figure 1A:
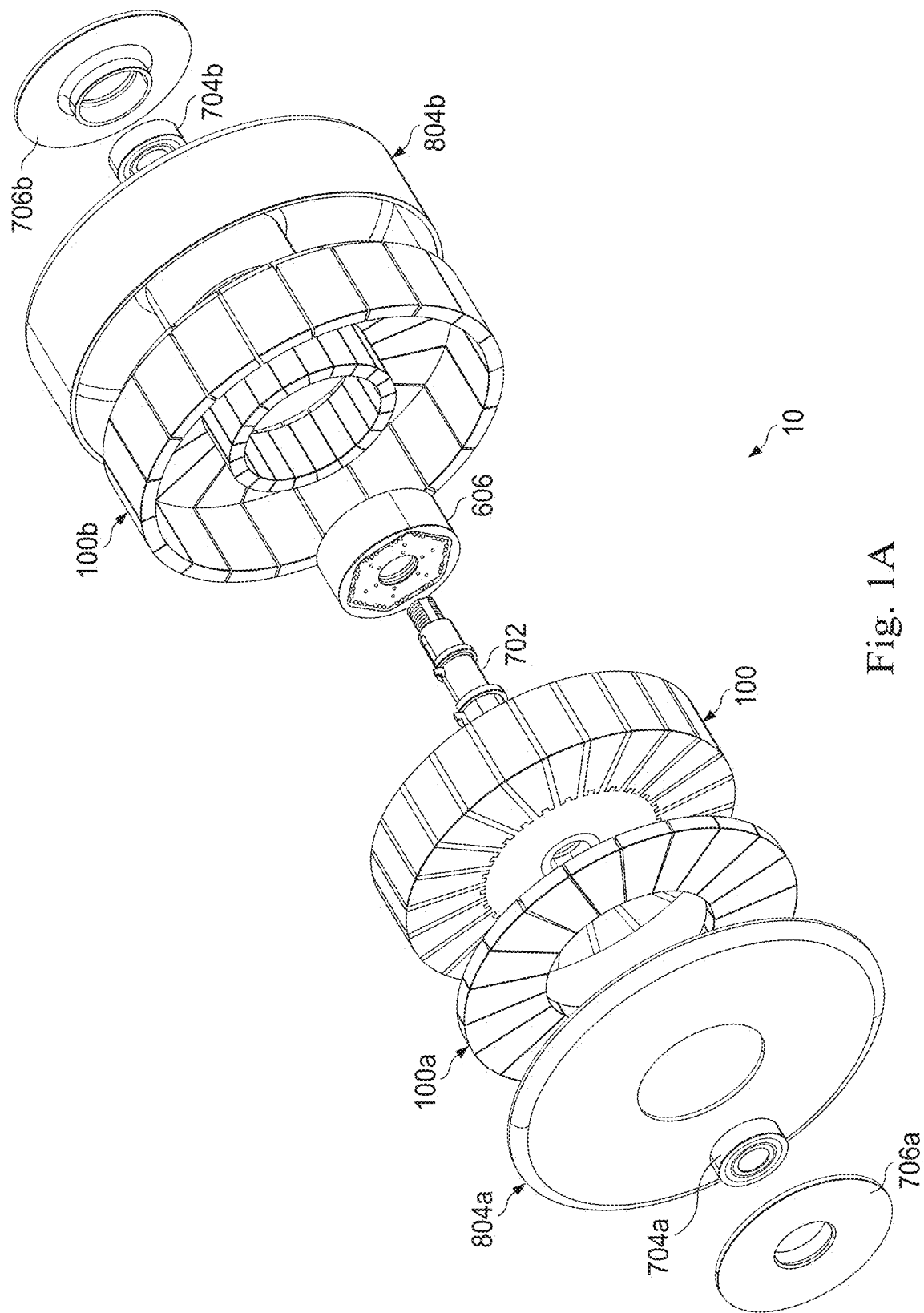
FIG. 1A is an exploded view of one embodiment of an electrical motor/generator component according to certain aspects of the present disclosure.

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

When directions, such as upper, lower, top, bottom, clockwise, counterclockwise, are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Clarification of Terms

The flow of current through a conductor creates a magnetic field. When a current carrying conductor is placed in a magnetic field the current carrying conductor will experience a force. The force that the current carrying conductor experiences is proportional to the current in the wire and the strength of the magnet field that it is placed in. Further, the force that the current carrying conductor experiences will be greatest when the magnetic field is perpendicular to the conductor. For the purposes of this application "flux current" is defined as the rate of current flow through a given conductor cross-sectional area. In some embodiments described herein the source of the magnetic field may be a current flowing in individual coils of a motor winding. In other embodiments, the source of the magnetic field may be a permanent magnet. The magnetic field associated with the permanent magnetic may be visualized as comprising of a plurality of directional magnetic flux lines surrounding the permanent magnet. The magnetic flux lines, often denoted as $\Phi$, or $\Phi_B$, are conventionally taken as positively directed from a N pole to a S pole of the permanent magnet. The flux density, often written in bold type as B, in a sectional area A of the magnetic field surrounding the permanent magnet is defined as the magnetic flux $\Phi$ divided by the area A and is a vector quantity.

For the purposes of this application permeability is a measure of the ability of a material to support the formation of magnetic field within the material. That is, permeability is the degree of magnetization that the material will obtain in response to an applied magnetic field.

For the purposes of this application an "inductor" is defined as an electrical component that stores energy in a magnetic field when electric current flows through the inductor. Inductors normally consist of an insulated conducting wire wound into a coil around a core of ferromagnetic material like iron. The magnetizing field from the coil will induce magnetization in the ferromagnetic material thereby increasing the magnetic flux. The high permeability of the ferromagnetic core significantly increases the inductance of the coil. In some embodiments described herein the permeability of the ferromagnetic core may increase the inductance of the coil by a factor of about one thousand or more. The inductance of a circuit depends on the geometry of the current path and the magnetic permeability of nearby materials. For instance, winding a copper wire into a coil increases the number of times the magnetic flux lines link the circuit thereby increasing the field and thus the inductance of the circuit. That is, the more coils the higher the inductance. The inductance also depends on other factors, such as, the shape of the coil, the separation of the coils, and the like. Flux linkage occurs when the magnetic flux lines pass through the coil of wire and its magnitude is determined by the number of coils and the flux density.

For the purposes of this application the axis of the rotor pole may be referred to as the direct-axis or d-axis, whereas the axis in quadrature to the rotor pole may be referred to as the quadrature axis or q-axis. The direct axis is the axis in which flux is produced by the field winding. The quadrature axis is the axis on which torque is produced by the field winding. The effect of the armature (stator) flux on the flux produced by the rotor filed is called the armature reaction flux. The armature reaction flux $\Phi_{AR}$ has two components, $\Phi_d$ along the direct axis and $\Phi_q$ along the quadrature axis. In AC motors the salient pole field winding rotates, as does the d-axis and q-axis spatially. By convention, the quadrature axis always leads the direct axis electrically by 90 degrees. The d-axis and q-axis inductances are the inductances measured as the flux path passes through the rotor in relation to the magnetic pole. The d-axis inductance is the inductance measured when flux passes through the magnetic poles. The q-axis inductance is the inductance measure when flux passes between the magnetic poles.

For the purposes of this application the term "excitation current" is the current in the stator winding required to generate magnetic flux in the rotor. Permanent magnet machines do not require an excitation current in the stator winding because the motor's magnets already generate a standing magnetic field. The torque-producing current is the current required to generate motor torque. In a permanent magnet machine, the torque-producing current makes up most of the current draw.

When the current flowing through the inductor changes, the time-varying magnetic field induces an Electromotive Force (emf) (voltage) in the conductor, described by Faraday's law of induction. According to Lenz's law, the induced voltage has a polarity which opposes the change in current that created it. As a result, inductors oppose any changes in current through them. For the purposes of this application the term "back electromotive force" or "back emf" is the voltage that occurs in electric motors when there is a relative motion between the stator windings and the rotor's magnetic field. The geometric properties of the rotor will determine the shape of the back emf waveform. The back emf waveforms may be sinusoidal, trapezoidal, triangular, or a combination thereof. Both induction and Permanent Magnet (PM) motors generate back emf waveforms. In an induction machine, the back-emf waveform will decay as the residual rotor field slowly decays because of the lack of a stator field. However, in PM machine the rotor generates its own magnetic field. Therefore, a voltage can be induced in the stator windings whenever the rotor is in motion. The back emf voltage will rise linearly with speed and is a substantial factor in determining maximum operating speed of an electric motor.

In some embodiments, the PM motor may be a surface permanent magnet motor (SPM). That is, the permanent magnets are affixed to an exterior surface of the rotor. In other embodiments, the PM motor may be an interior permanent magnet motor (IPM). That is, the permanent magnets are inside or encapsulated by the rotor.

An electric motor's torque comprises of magnetic torque and reluctance torque. Magnetic torque is the torque generated by the interaction between the magnet's flux field and the current in the stator winding. Reluctance torque is the force acting on a ferromagnetic material placed in an external magnetic field that causes the ferromagnetic material to align with the external magnetic field, such that, the reluctance is minimized. That is, reluctance torque is the torque generated by the alignment of the rotor shaft to the stator flux field.

For the purposes of this application the term "magnetic saliency" describes the relationship between the rotor's main flux (d-axis) inductance and the main torque-producing (q-axis) inductance. The magnetic saliency may vary depending on the position of the rotor to the stator field, with maximum saliency occurring at 90 electrical degrees from the main flux axis. A Surface Permanent Magnet (SPM) motor has a near unity saliency ratio. That is, the d-axis inductance is approximately equal to the q-axis inductance regardless of the rotor position, because of this SPM motor designs rely significantly, if not completely, on the magnetic torque component to produce torque. In contrast to the SPM motor, the magnetic saliency of the Internal Permanent Magnet (IPM) motor is quite high, with the q-axis inductance being relatively high compared to that of the d-axis inductance. For this reason, an IPM motor can generate torque using both the magnetic torque and the reluctance torque components. In some embodiments, the mechanical strength of the IPM motor may be higher than the SPM Motor because the magnets are embedded in the rotor. In certain embodiments, the IPM motor may be used in applications requiring a higher rpm For purposes of this application the term "back iron" may refer to iron or any ferrous-magnetic compound or alloy, such as stainless steel, any nickel or cobalt alloy, electrical steel, laminated steel, laminated silicon steel, or any laminated metal comprising laminated sheets of such material, or a sintered specialty magnetic powder.

System Overview of the GEN II Embodiment

FIG. 1A is an exploded isometric view of an electric machine 10 comprising a magnetic toroidal cylinder 100 including a first portion 100*a* and a second portion 100*b*, a coil winding assembly 500 (not shown), a back-iron circuit 804 including a first portion 804*a* and a second portion 804*b*, a center shaft or axle 702 and structural components, such as bearings 704*a* and 704*b* and bearing flanges 706*a* and 706*b*, respectively. Embodiments, of the electric machine 10 are also known as the Hunstable Electric Turbine (HET) or a circumferential flux four rotor electric machine.

The back-iron circuit 804 while theoretically optional serves to strengthen magnetic elements as described below and constrain the magnetic circuit to limit reluctance by removing or reducing the return air path.

In other embodiments, the back-iron circuit 804 may be electric steel (magnet steel) that also provides structural integrity due to its high rigidity/stiffness. In other embodiments, the back-iron circuit 804 may be made from tape wound magnetic steel laminations using high-speed tape winding techniques. 'The tape may have an insulated coating which then separates each magnetic steel lamination so that the magnetic flux cannot migrate from one lamination to the next. In other embodiments, the tape may be coated with an insulating layer of an electrically insulating polyimide sheet, an aromatic nylon sheet, a synthetic fiber sheet, or other non-surface core plating electrically insulating sheet to further reduce the flux and current flow. This forces the magnetic flux to stay in within each magnetic steel lamination and to flow only in the plane of the magnetic steel tape. In embodiments using a Halbach array such heavy materials are not needed (although a stiff structure may be required for structural integrity—such as Polyether Ether Ketone (PEEK), aluminum or carbon fiber).

In the embodiment of FIG. 1A, the coil winding assembly 500 is the stator and the magnetic toroidal cylinder 100 is the rotor and structural members, such as bearing flanges 706*a* and 706*b* and bearings 704*a* and 704*b* position the electric machine 10 about the center shaft 702. In other configurations, the coil winding assembly 500 may be a rotor and the magnetic toroidal cylinder 100 the stator. Further, the illustrated embodiment is only one way of configuring and supporting the motor modules and/or the coil winding assembly 500. In other embodiments the coil winding assembly 500 may be supported by support ring extending through a center slot between the outer cylindrical walls from the coil winding assembly 500 to an exterior casing or housing. In yet other embodiments when the coil winding assembly 500 is functioning as a rotor, the coil winding assembly 500 may be supported by a support ring extending through a center slot between the inner cylindrical walls from the coil winding assembly 500 to the shaft. The exact configuration depends on design choices as to whether the coil winding assembly 500 is to be the stator or the rotor.

Magnetic Toroidal Cylinder

FIG. 1B1 is a detailed isometric view of one embodiment of the assembled magnetic toroidal cylinder 100 or magnetic disk of FIG. 1A. In the embodiment illustrated in FIG. 1B1, the magnetic toroidal cylinder 100 is centered about a longitudinal axis 101. In certain embodiments, the magnetic toroidal cylinder 100 may include a first axial wall 102 (also called a side wall or radial wall) and a second or opposing axial wall 104 positioned a predetermined distance from the first axial wall 102 along the longitudinal axis 101. An outer cylindrical wall 106 and an inner cylindrical wall 108 are generally longitudinally positioned between the first axial wall 102 and the second axial wall 104.

In certain embodiments, the axial walls 102, 104 and cylindrical walls 106,108 may be made of out magnetic material, such as: Neodymium, Alnico alloys, ceramic permanent magnets, electromagnets, Halbach Arrays, or the like.

FIG. 1B2 is an isometric view of one embodiment of a magnetic tunnel segment 150 which defines an interior space or "magnetic tunnel" 158. For instance, the magnetic tunnel segment 150 illustrated in FIG. 1B2 may be a portion of the magnetic toroidal cylinder 100 illustrated in FIG. 1B3.

Arrow 122 illustrates a circumferential direction with respect to the longitudinal axis 101 (not shown in FIG. 1B3) and arrow 124 illustrates a radial direction with respect to the longitudinal axis 101. Arrow 122 also indicates a relative circular path of motion.

For the particular magnetic tunnel segment 150, the north magnetic pole(s) of the magnet(s) forming the outer exterior wall 152 are orientated in a radial direction such that they face inward towards the interior space or tunnel 158. Similarly, the north magnetic pole(s) of the magnet(s) forming the inner interior wall 154 are orientated in a radial direction such that they also face inward towards the interior space or tunnel 158. Thus, both the outer exterior wall 152 and the inner interior wall 154 have their magnetic poles generally orientated in the radial direction with respect to the longitudinal axis 101 as indicated by the arrow 124 of FIG. 1B2. In contrast, the magnetic poles of the magnets forming the first axial wall 160 and the second axial wall 162 have their magnetic poles orientated generally parallel to the longitudinal axis 101.

Thus, in the illustrative embodiments of FIGS. 1B2 and 1B3, the individual magnets in the magnetic walls 152, 154, 160, and 162 all have their "like magnetic poles" orientated towards the interior space 158 or away from an interior space 158 enclosed by the walls 152, 154, 160, and 162 of the magnetic toroidal tunnel segment 150. The term "like magnetic poles" used in this disclosure refers to a group of magnetic poles of either all north poles or all south poles. For instance, the magnetic pole orientation or configuration illustrated in FIGS. 1B2 and 1B3 may be called a "NNNN" magnetic pole configuration because all of the magnets forming the magnetic walls 152, 154, 160 and 162 have their north poles facing inward.

In some embodiments, one or more of the magnetic walls may define a transverse slot. For instance, in the illustrative embodiment of FIG. 1B2. In the outer exterior wall 152 and the first axial wall 160 may define a slot 112 or the inner cylinder wall 108 and/or outer cylinder wall 106 may define a slot 110. In certain embodiments, the slots 110, 112 may be wide enough to be used to enable the passage of a support structure, electrical wires and/or conduits or cooling conduits, but narrow enough to keep the flux forces from exiting through the slots.

FIG. 1B3 illustrates the complete magnetic toroidal cylinder 100 formed from combining four magnetic tunnel segments 150a through 150d arranged circumferentially around a common center or longitudinal axis 101 and inter-dispersed within four magnetic tunnel segments 180a through 180d. The poles of magnets creating the magnetic tunnel segments 150a through 150d are orientated in a specific geometric arrangement to form a NNNN. The poles of magnets creating magnetic tunnel segments 180a through 180d are orientated in a specific geometric arrangement to form a SSSS magnetic configuration.

Coil Winding Assembly

When the electric machine 10 is assembled, a coil winding assembly 500 is concentrically positioned between the outer exterior wall 152 and the inner interior wall 154, and also longitudinally positioned between the first axial wall 160 and the second axial wall 162 forming the magnetic toroidal cylinder 100. FIG. 1C1 is a detailed isometric view of a coil module 30. The coil winding assembly 500 may be formed by a plurality of coil modules 30 and pole positioned about a central core or yoke 42 (see FIGS. 1C1 through 1D3.

FIG. 1C2 is a detailed exploded isometric view of the various components comprising the coil module 30 including a bobbin 36, a coil 526, a PCB module 32, and the first pole portion 34a.

In some embodiments, the bobbin 36 may be sized to be positioned onto a yoke 42, discussed below. In certain embodiments, the bobbin 36 may be made from a Polyether ether ketone (PEEK), which is a colorless organic thermoplastic polymer material or a glass-reinforced thermoplastic. The coil 526 surrounds and is wound around the bobbin 36. The coil 526 may be made from a conductive material wire, such as copper or a similar alloy. In other embodiments, concentrated windings may be used. In certain embodiments, the individual coils 526 may be essentially cylindrical, square, or rectangular in cross-sectional shape.

The windings of each coil 526 are configured such that they are generally perpendicular to the direction of the relative movement of the magnets or rotor. In other words, the coil windings 526 are positioned such that their longitudinal sides are parallel with the longitudinal axis 101 and their ends or axial sides are radially perpendicular to the longitudinal axis 101. Thus, the coil windings 526 are also transverse with respect to the magnetic flux produced by the individual magnets of the rotor at their interior face. Consequently, essentially the entire coil winding 526 or windings may be used to generate motion in motor mode or voltage in generator mode.

The PCB module 32 is positioned radially adjacent to the inside face of the coil 526 and is electrically coupled to the coil 526. In certain embodiments, the PCB module 32 may include one or more sensors, including thermal sensors and Hall Effect sensors (not shown). In some embodiments, one or more of the thermal sensors may be a thermocouple. In yet other embodiments, there may be antennas and transceivers for wireless power transfer and/or communication transfer. In certain embodiments, there may be PCB connectors 37 that allow the coils 526 to plug directly into a brushless motor controller (not shown) or a PCB power module (not shown).

FIG. 1C3 is an isometric view of a coil module 30 sandwiched between two pole portions 34a and 34b. In some embodiments, the coil module 30 may be sandwiched between the two pole portions 34a and 34b for phasing purposes. In yet other embodiments, a "coil" for phasing purposes may actually be two physical coils 526 (and its associated bobbin 36 and PCB module 32) separated by the pole portions 34a or 34b. Positioning the coils 526 within the pole portions 34a and 34b reduced the air gap between the coils 526. By reducing the air gap, the coil winding assembly 500 can contribute more flux linkage to the overall torque produced by the motor. In certain embodiments, the first pole portion 34a and second pole portion 34b may operate together as a single pole for phasing purposes.

When the coil winding assembly 500 is energized, the current running through the coil windings 526 positioned within the magnetic tunnel segments 150a through 150d runs in an opposite direction than the current running through the coil windings positioned in the magnetic tunnel segments 180a through 180d so that the direction of the generated magnetic force or torque is the same throughout the entire magnetic toroidal cylinder 100.

In certain embodiments, the pole portion 34 is a flux concentrator and is formed such that one side of the coil 526 partially fits within an indent formed within the side of the respective pole portion. In certain embodiments, the pole portion 34 may be a solid material structure, which is sintered cast or 3D printed, solid block material, back iron material, and/or heatsink material. In some embodiments, the pole portion 34 may be made from aluminum and may be used as a heat sink to draw heat to either the back-iron circuit described below or another cooling mechanism or heat sink.

In yet other embodiments, the pole portion 34 may be formed of a "soft magnetic" material. In certain embodiments, an isolation spacer or heat sink (not shown) may be positioned on the central core 42 adjacent to the pole portion 34a or 34b. In some embodiments, the spacer may be made from a lightweight non-magnetic filler material, such as aluminum, TPG, carbon fiber, or plastic. In other embodiments, potting material may be used as a spacer. As described above, the magnets of the magnetic toroidal cylinder 100 focus the flux inwardly, but the poles and spacers can further direct the flux flow path as desired.

The Central Core or Yoke

FIG. 1D1 is an isometric view of a central core or yoke 40 for the coil winding assembly 500. The central core 42 may be made out of back iron material so that it will act as a magnetic flux force concentrator and distributes magnetic flux to each of the stator pole portions 34a and 34b. In some embodiments, the central core 42 may define one or more fluid communication passageways to allow for air or liquid cooling. In certain embodiments, the central core 42 may be made of at least two central core segments 42a and 42b.

The coil modules 30 are modular and the size of the bobbin 36 and pole portions 34a and 34b are designed to allow the PCB modules and pole portions to slide over the central core segments 42a and 42b. FIG. 1D2 is an isometric view of the central core segment 42a having two coil modules 30 positioned about the coil segment 42a. FIG. 1D3 is an isometric view of the central core segment 42a illustrating coil modules completely positioned over the central core segment 42a. Any number of coil modules 30 may be coupled depending on the particular application. In some embodiments, the coils 526 may essentially form one continuous coil 526, similar to a Gramme Ring.

FIG. 1E1 is an isometric view of a coil winding assembly 500 formed by joining the core portion illustrated in FIG. 1D3 with another core portion also having a full complement of coil modules 30 and a spider 604.

In some embodiments, the spider 604 assists with placement and alignment of the coil modules 30 and is designed to fit within a central interior space of the coil winding assembly 500 as illustrated. In certain embodiments, the spider 604 has a plurality of radial arms 610. At the distal end of each radial arms 610 is a dovetailed engagement notch 605. The engagement notch 605 is sized to be slid into the respective receiving slot 47 formed in the pole portions 34a and 34b (see FIG. 1C1) of the coil modules 30. The spider 604 helps align the individual coil modules 30 and indirectly joins the two central core segments 42a and 42b together.

Figure 1F:
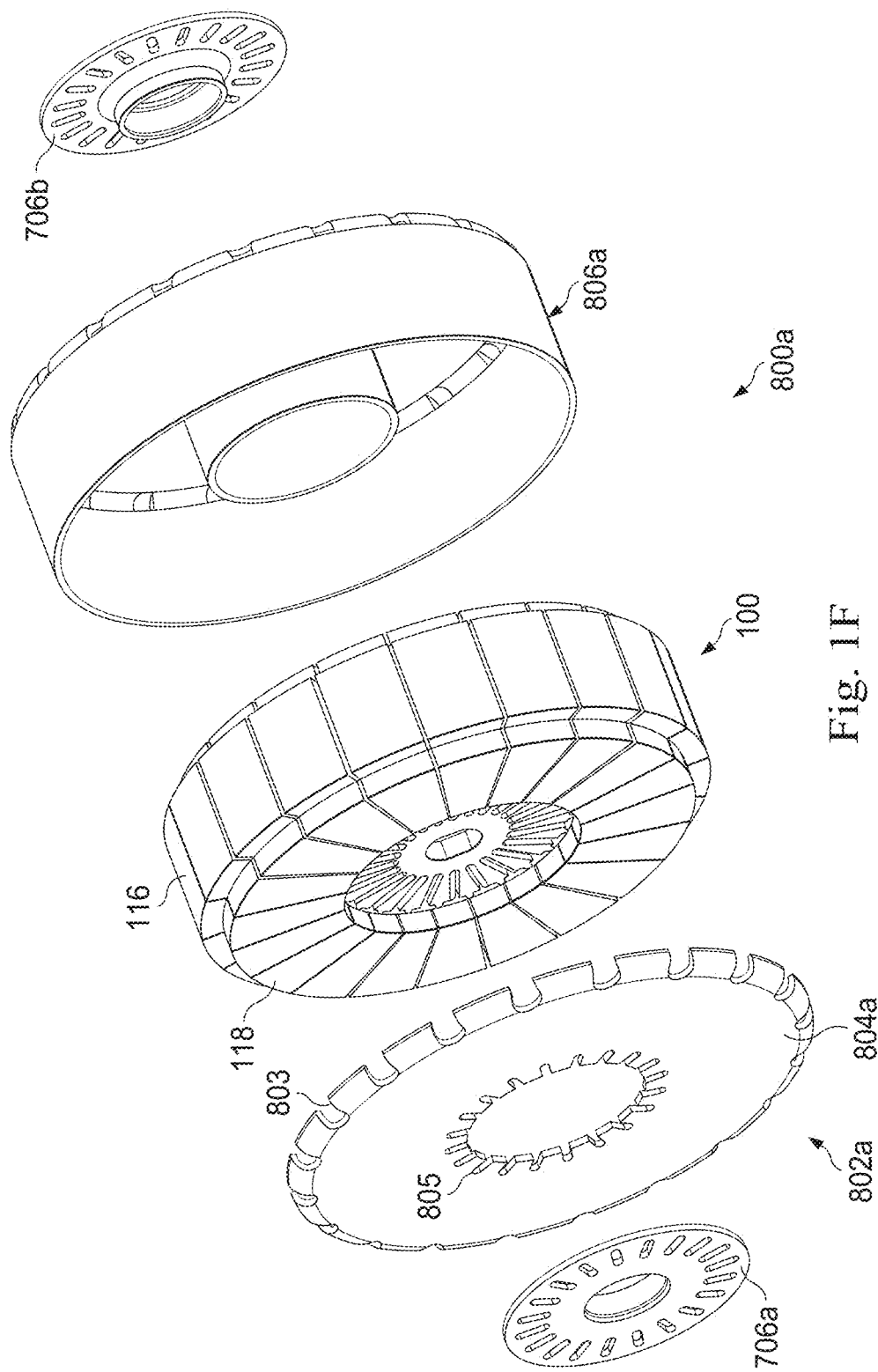
FIG. 1F is an isometric exploded view of the toroidal motor element and a back-iron circuit.

Once the spider 604 is in position, a PCB power module 640 can then be added to the coil winding assembly 500 as illustrated in FIG. 1F2. The PCB power module 640 is designed to fit within a central interior space of the coil winding assembly 500. In certain embodiments, the PCB connectors 37, as illustrated in FIGS. 1C1 through 1C4, can be electrically coupled to the PCB power module 640.

In some embodiments, the entire coil winding assembly 500 may be potted with a potting compound, which may be an epoxy material.

In order maintain the generated torque and/or power the individual coils 526 in the coil winding assembly 500 may be selectively energized or activated by way of a high-power switching system or brushless motor controller 1204 which selectively and operatively provides electrical current to the individual coils 526 in a conventional manner. In order to maintain rotation adjacent coils 526 may be powered up in turn. For instance, the brushless motor controller 1204 may cause current to flow within the individual coil 526 when the individual coil 526 is within a magnetic tunnel segment with a NNNN magnetic pole configuration. On the other hand, when the same individual coil moves into an adjacent magnetic tunnel segment with a SSSS magnetic pole configuration, the brushless motor controller 1204 causes the current within the individual coil 526 to flow in the opposite direction so that the generated magnetic force is always in same direction.

The individual coils 526 may use toroidal winding without end windings and in some embodiments be connected to each other in series. In other embodiments, a three-phase winding may be used where adjacent coils 526 are connected together to form a branch of each phase. For instance, two adjacent coils 526 may be phase A coils, the next two adjacent coils 526 may be phase B coils, and the next two adjacent coils 526 may be phase C coils. This three-phase configuration would then repeat for all individual coils 526 within the coil winding assembly 500. When the coils 526 are energized, the three-phase winding can produce a rotating magnetic field in the air gap around the coil winding assembly 500. The rotating magnetic field interacts with the magnetic field generated by the toroidal magnetic tunnel producing torque and relative movement between the coil winding assembly 500 and the toroidal magnetic tunnel. That is, the brushless motor controller 1204 applies current to the phases in a sequence that continuously imparts torque to turn the magnetic toroidal cylinder 100 in a desired direction, relative to the coil winding assembly 500, in motor mode.

In certain embodiments, the brushless motor controller 1204 may be electrically coupled to the PCB power module 602 to form a power module assembly 606. In one embodiment, the power module assembly controller 606 may be designed to fit within an interior central cavity of the coil winding assembly 500 as illustrated in FIG. 1E2. In another embodiment, the power module assembly controller 606 may be potted.

In other embodiments, the electric machine 10 may have vents for air flow circulation. Such an embodiment is illustrated in the exploded isometric view of FIG. 1F1. In this embodiment the first side wall 804*a* includes a plurality of outer notches or vents 803 defined around the outer circumference wherein the notches are sized to induce an air flow. There is also a plurality of inner notches or vents 805 defined around the inner circumference of the first side wall 804*a*.

As opposed to "pancake style" or axial flux electric machine 10, in certain embodiments, the longitudinal length or "width" of the outer circumferential wall 810 and inner circumferential wall 812 are greater than the radial depth or lateral length of the side walls 808*a* and 808*b*.

This exemplary geometric proportion results in greater torque generation along the interface of the outer circumferential wall 810 and coil winding assembly 500. In certain alternate embodiments, the thickness of the magnets comprising the outer circumferential wall 810 may also be increased to increase the generation of torque. In any event, the contribution to torque from the outer circumferential wall 810 and the inner circumferential wall 812 wall may be greater than the contribution from the side walls 808*a* and 808*b* due to the geometry of the cross-section of the magnetic tunnel segments 420, 421 and the varying effect force/radius of the components.

Although the central core 42, coil winding assembly 500, and magnetic tunnel segments 150, 180 are illustrated in cross-section as rectangular, any cross-sectional shape may be used depending on the design and performance requirements for a particular electric machine 10.

Advantages of Certain Embodiments

One of the advantages of this type of configuration over conventional electric motors is that the end turns of the coils 526 are part of the "active section" or force generation section of the electric machine 10. In conventional electric motors, only the axial length of the coils produces power, the end turns of the coils do not produce power and merely add weight and copper losses. However, as explained above, the entirely of the coil 526 is effectively utilized to produce torque because of the side axial walls 102, 104 or axial magnets. Therefore, for a given amount of copper more torque can be produced compared to a conventional electric motor.

In summation, surrounding the coils 526 with magnets creates more flux density and most of the magnetic forces generated are in the direction of motion so there is little, if any, wasted flux compared to a conventional electric motor. Further, because the forces are now all in the direction of motion more torque is generated and the configuration further minimizes vibration and noise compared to a conventional electric motor where the forces, depending on the polarity of the current in the coil may try and pull the coil downwards or push the coil upwards and therefore not in the direction of motion. Further, continuous torque and continuous power are greatly increased compared to a conventional electric motor as is the motor's torque density and power density by volume and weight. Even further, although the coil winding assembly 500 may be compact, the coils 526 are easily cooled because they are surrounded by an effective heat sink and since there is little to no overlap of the coil windings 526, there is little if any unwanted field induction which also contributes to a more efficient electric motor design. Further, these features and advantages can be expanded to include asynchronous and synchronous motor/generators that function without the use of permanent magnets. Such motors include embodiments for switched reluctance motors (SRM), induction motors (IM), reluctance synchronous motors (RSM), and the like.

Reluctance Synchronous Machine Embodiment

If slots are cut into the conductorless magnetizable material of the rotor of an Induction Motor (IM), corresponding to the slots in the stator, the result is a Reluctance Synchronous Motor (RSM). Since the rotor core(s) of the RSM comprises a single slotted cylinder of magnetizable material the rotor core may be operated at much higher rotational speeds than other types of electric motors. The SRM starts as an IM but once started runs with a small amount of synchronous torque. The synchronous torque is due to changes in the reluctance of the magnetic path from the stator through the rotor as the slots align. The RSM is an inexpensive means of developing a moderate synchronous torque. Low power factor, low pull-out torque, and low efficiency are characteristics of the direct power line driven RSM.

RSM have an equal number of stator and rotor poles. Projections on the rotor are arranged to introduce internal flux "barriers" (e.g., holes or spaces that direct the magnetic flux along the so-called "direct axis.") Typical pole numbers for the rotor of a conventional RSM are 4 and 6, and the rotor operates at synchronous speeds without current-conducting parts. Rotor losses are minimal compared to those of a conventional IM. Once started at synchronous speed, a conventional RSM can operate with sinusoidal voltage, though speed control normally requires a variable-frequency drive. In some embodiments, the rotating sinusoidal Magnetic Force (MMF) may be produced by the coil winding assembly 500 described herein for torque production.

Figure 2A:
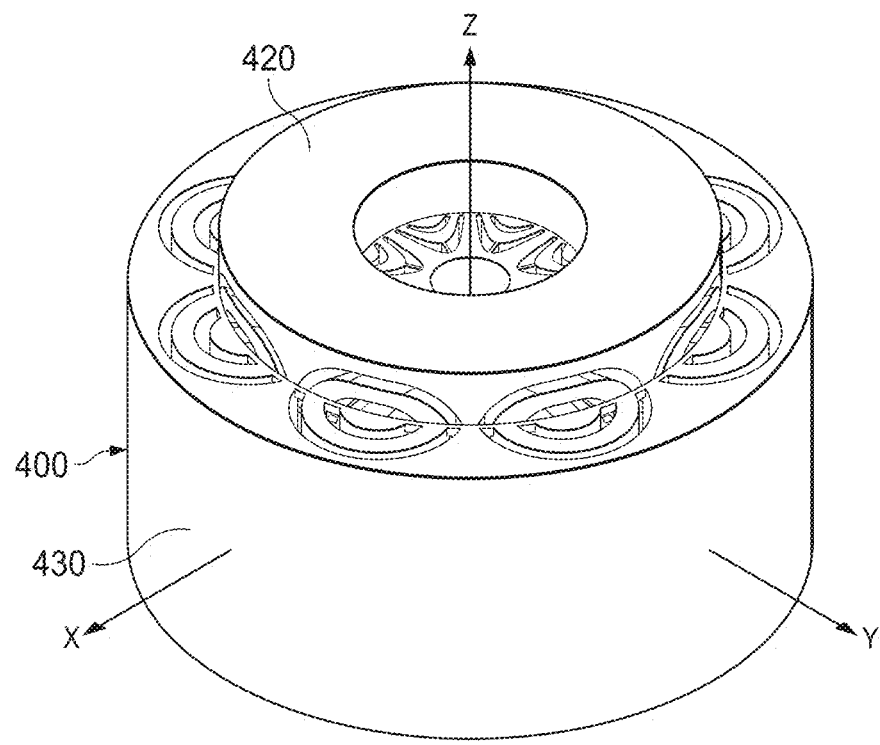
FIG. 2A is an isometric view of one embodiment of a Reluctance Synchronous Motor (RSM) according to the principles of the present invention.

FIG. 2A is an isometric view illustrating one embodiment of a Reluctance Synchronous Motor (RSM) 400. An alternate use of the same mechanical configuration is as a Reluctance Synchronous Generator (RSG) where the sequentially switching of a load across the different winding is synchronized to the rotation. In the following embodiments the abbreviation RSM 400 may therefore be extended to mean Reluctance Synchronous Machine.

Higher efficiency is always a requirement for electric machines and Flux Density Distribution (FDD) within an electric machine has a significant effect on the electric machine's torque, efficiency, torque ripple, and pulsation performance. Cavities formed in the rotor core(s) or stator core provides higher performance in these areas. That is, the use of cavities may result in a more efficient use of flux linkage in the electric motor. However, a laminated structure creates a predominately 2D flux path inside the core(s) for the magnetic flux to follow when the motor is in operation. In an electric motor having for instance a 3D magnetic flux tunnel comprising conductorless magnetizable material this may not be the optimum solution. The use of flux-shaping cavities or slots to optimize the FDD in the stacked laminated ferromagnetic sheets of the rotor core(s) or stator core recognizes and addresses this problem.

Figure 2B:
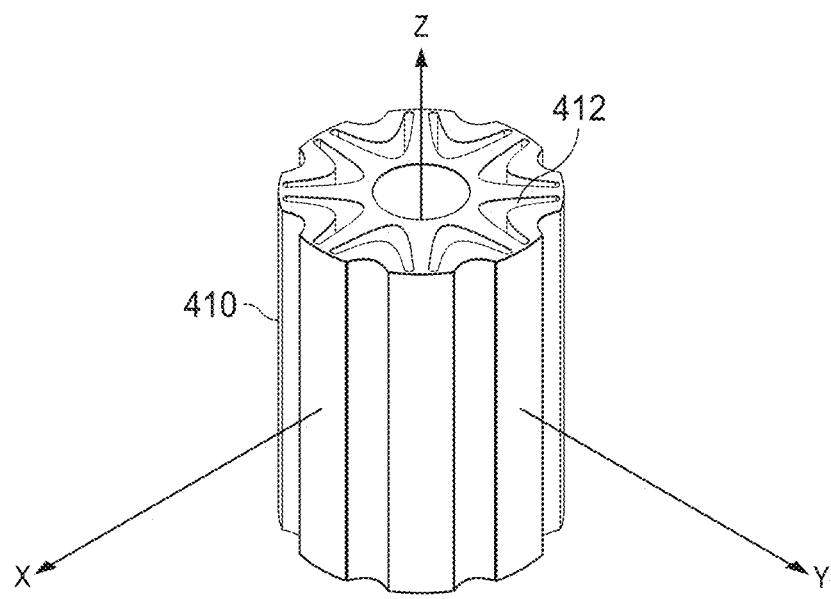
FIG. 2B is an isometric view of an inner rotor core of the Reluctance Synchronous Motor.

As illustrated in FIG. 2B the inner rotor core 410 of the RSM 400 may be cageless. In some embodiments, the inner rotor core 410 may comprise a substantially solid core of iron or back iron, so that, the inner rotor core 410 will act as a magnetic flux concentrator. Flux-shaping cavities 412 or slots may be used to optimize the Flux Density Distribution (FDD) in the laminated inner rotor core 410 of the RSM 400. In the illustrate embodiment of FIG. 2B the shape of the flux-shaping cavity(s) 412 in each portion of the inner rotor core 410 is analogous or similar to an elliptical segment. In the illustrative embodiment of FIG. 4B, the inner rotor core 410 has eight sets of elliptical segments.

In some embodiments, the shape of the cavity 412 may deviate from an elliptical segment. In certain embodiments, there may be more than one cavity 412 and/or shape in each portion of the inner rotor core 410 to focus and direct the flux field towards the desired orientation. That is, there may be concentric cavities 412 in each portion of the inner rotor core 410. In certain embodiments, the shape of the cavity 412 may substantially a two-dimensional shape, that is, the length and the height of the shape of the cavity 412 does not change with the width or depth. In one embodiment, the shape of the cavity 412 may be a three-dimensional shape, that is, the length or height of the shape of the cavity 412 may vary with the width.

In some embodiments, the cavity 412 may be a void that is completely empty of material. In certain embodiments, the cavity 412 may be filled, partially or completely, with a non-magnetic material. In one embodiment, the cavity 412 may be filled, partially or completely, with a permeant magnetic material. For instance, a permeant magnet may be embedded in a central portion of the cavity 412.

In some embodiments, an outer portion of the inner rotor core 410 may form a segment of an elliptical cavity 412, such that the surface of the inner rotor core 410 forms a plurality of salient poles. Various topologies may be evaluated for the proposed shape of the cavities 412 and their configurations. Specifically, a finite-element method may be carried out to evaluate the proposed shape of the cavities 412 and configurations. Further, various topologies may be investigated for the shape of the cavities 412 to reduce torque ripple and the like. In conclusion, the proposed inner rotor core 410 configuration will result in a more efficient use of the inner rotor core material in the electric machine 10.

Ideally the power losses in the RSM 400 should be confined to the copper losses in the coil winding assembly 500. However, while the inner rotor core 410 is not designed to have any current flow through it, it is however a conducting loop that experiences a changing magnetic field. Therefore, the inner rotor core 410 will have small currents induced in it that are proportional to the area of the loop formed by the inner rotor core 410. These induced currents are called eddy currents and the losses associated with the eddy currents, and hysteresis, must be added to the copper losses in the coil winding assembly 500 when determining the efficiency of the RSM 400.

Conventional electric motors have conventionally been made with either or both the stator core and the rotor core made of laminated ferromagnetic sheets that have an insulating coating on each side, which are stacked to form a core assembly. The thickness of the laminations is directly related to the level of heat losses produced by the electric motor when operating, which is commonly referred to as eddy current losses. The thinner the laminations, the less the eddy current losses.

In some embodiments, the inner rotor core 410 of the RSM 400 may comprise laminated sheets of back iron material. For instance, the inner rotor core 410 may comprise a stack of cold-rolled laminated strips of electrical steel separated by a small airgap. In certain embodiments, the thickness of the laminated strips may be less than about 2 mm. In one embodiment, the air gap between adjacent laminations is less than about one-half mm thick.

In some embodiments, the cavities 412 may be punched in laminations of electrical steel. Electrical steel, also known as lamination steel, silicon electrical steel, silicon steel, relay steel, transformer steel, and the like, is an iron alloy tailored to produce specific magnetic properties: small hysteresis area resulting in low power loss per cycle, low core loss, and high permeability.

In certain embodiments, the laminated sheets may comprise non-oriented electrical steel sheets. Because the magnetic field in the inner rotor core 410 is alternating with time, the inner rotor core 410 may be constructed to further reduce core energy losses. In one embodiment, the inner rotor core 410 may be made of thin laminations which are electrically separated by an insulator to reduce eddy currents circulating in the inner core 410. For instance, the steel laminations may be coated with an oxide layer. The oxide layer may act as an insulator preventing unwanted axial eddy currents from flowing in the rotor(s). In certain embodiments, the steel laminations may be coated with an insulating polyimide sheet, an aromatic nylon sheet, a synthetic fiber sheet, or other non-surface core plating electrically insulating sheet to further reduce the flux and current flow.

In some embodiments, the laminated sheets may be made from a 2D flux path material, such as, Cold-rolled Grain-Oriented (CRGO) electrical steel. CRGO electrical steel may have a low carbon content but a high-silicon level of about 3% (Si: 11Fe). The small amount of silicon in CRGO electric steel, while making the electrical steel more brittle dramatically increases the resistivity of the electrical steel to several times that of pure iron, thereby further reducing eddy currents. The magnetic flux of CRGO electrical steel may be about 30% higher in the cold-rolled direction. Electrical steel made without special processing to control the crystal orientation, that is Cold-rolled Non-Grain-oriented (CRNGO) steel, usually has a silicon level of 2 to 3.5% and has similar magnetic properties in all directions. That is, CRNGO steel is an isotropic material.

In some embodiments, the laminated sheets may be die cut to shape and stacked together to form the solid laminated inner rotor core 410 of the RSM 400. Referring once more to embodiment illustrated in FIG. 2B, each of the laminated sheets has been cut into a disk having circular aperture in a center of the disk for a rotor shaft and a plurality of cavities 412 evenly spaced about a circumference of the disk. In some embodiments, the electrical steel sheets may be coated to increase electrical resistance between the laminations, to reduce eddy currents, provide resistance to corrosion or rust, and to act as a lubricant during the die cutting process.

In some embodiments, the core(s) of the RSM 400 may constructed such that adjacent laminations having a first permeability are situated between laminations having a second permeability, or where a plurality of lower permeability laminations is situated between laminations having a higher permeability. In certain embodiments, there may be a plurality of lower permeability limitations situated between a plurality of higher permeability limitations These laminated stator or rotor structures create a predominately 2D flux path inside the cores for the magnetic flux to follow when the RSM 400 is in operation. Referring once more to the 4-rotor embodiment of FIG. 2A the flux may not act in substantially a single direction. Therefore, 2D flux path material, such CRGO electrical steel laminations used in a conventional electric motor may not be the best choice.

In some embodiments, a 3D flux path material may be used for the rotor core(s). The 3D flux path material may comprise a soft magnetic composite (SMC) material, for instance ferromagnetic particles that are individually surrounded by an insulative material or film, that, when bonded together into a solid block form a composite material that enables the magnetic flux to flow in any direction throughout the block with low eddy current losses. SMCs offer several advantages over conventional laminated steel cores in electric machine applications, which include three-dimensional (3D) isotropic ferromagnetic behavior, very low eddy current loss, relatively low total core loss at medium and high frequencies, possibilities for improved thermal characteristics, flexible machine design and assembly, and the potential for greatly reduced weight and production costs. Examples, of SMCs include: pure iron powder with resin; sintered iron-based powders; pure iron powder with additions of zinc stearate and carbon; iron-based powder alloys (Fe, Ni, Co, Si), and commercially available iron powder, such as "Somaloy." Further, many of the benefits of existing 3D flux path materials may be obtained by using a new type of 3D flux material.

In some embodiments, the 3D flux material may be a ferromagnetic open cell metal foam material which is infused with a structural support matrix made of thermoset or a thermoplastic resin material. The ferromagnetic open cell metal foam material may be used as an alternative to the laminated or SMCs cores discussed herein. A thermosetting polymer, resin, or plastic, often called thermoset, is a polymer that is irreversibility hardened by curing from a soft solid or viscous liquid prepolymer or resin. Curing can be induced by heat or suitable radiation and may be promoted by high pressure or mixing the thermoset with a catalyst. In other embodiments, the ferromagnetic open cell metal foam material may be infused with a dissimilar ferrous metal matrix. In yet other embodiments, the open cell metal foam material may be infused with a non-ferrous metal matrix.

In some embodiments, the ferromagnetic open cell foam core may be comprised of a roll of ferromagnetic metal foam material whose layers may or may not be separated from each other by an electrically insulating material. In certain embodiments, the ferromagnetic open cell metal foam core may be secondarily machined, pressed or formed by alternative means to a final desired shape. In one embodiment, the ferromagnetic open cell metal foam core may or may not have permanent magnets placed on or within the ferromagnetic open cell metal foam structure in a preferred location and orientation before the thermoset or thermoplastic resin matrix is infused and solidified.

In other embodiments, the ferromagnetic open cell form core may or may not have one or more wound magnetic wire coils inserted into a preferred location and orientation before the thermoset or thermoplastic resin matrix is infused and solidified. In certain embodiments, the ferromagnetic open cell metal foam core may or may not have an electronic PCB with discrete electronic components placed within the ferromagnetic metal foam core in a preferred location and orientation before the thermoset or thermoplastic resin matrix is infused and solidified.

In some embodiments, the composite of the thermoset material may be optimized for its magnetic properties. That is, the strands of the ferromagnetic open cell foam are small enough in cross-section to prevent eddy current losses while carrying the magnetic flux of the electric machine 10. In certain embodiment, the composite of the thermoset material may be optimized for its mechanical proprieties. That is, the strands of the ferromagnetic open cell metal foam may be configured to act as a "structural fiber" that is supported by the thermoset or thermoplastic resin matrix which distributes the structural loads from one "structural fiber" to the next. In one embodiment, the composite of the thermoset material may be configured to balance the magnetic and mechanical properties. In either case, the resulting ferromagnetic metal foam composite core motor structure(s) would result in an electric motor that is substantially lighter in weight than other motors available on the market and enable a significantly higher torque density than existing electric motors whether they be of the 2D or 3D flux path motor architecture type.

In some embodiments, the porosity of the ferromagnetic open cell metal foam material may be between about 75% and about 95% by volume. In certain embodiments, the strength of the ferromagnetic open cell metal foam material may be proportional to its density. For instance, the strength of the open cell metal foam material may be a power law with respect to its density. That is, an open cell metal foam material having a porosity of about 20% may be more than twice as strong as an open cell metal foam material having a porosity of about 10%.

Figure 2C:
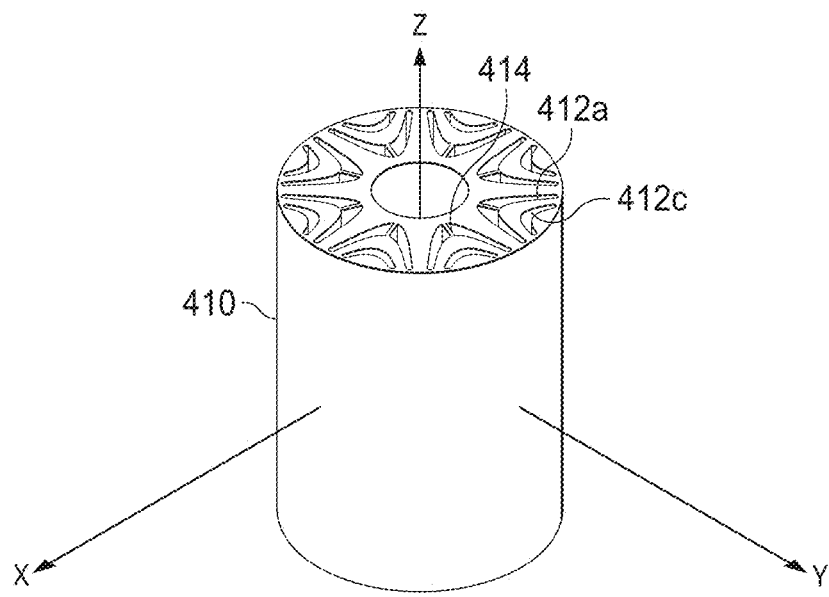
FIG. 2C is an isometric view of another embodiment of an inner rotor core of the Reluctance Synchronous Motor.

FIG. 2C is an isometric view illustrating another embodiment of the inner rotor core 410 of the RSM 400. In the illustrative embodiment of FIG. 2C the shape of the cavity 412 in each portion of the inner rotor core 410 is analogous or similar to an elliptical segment. As illustrative there is an inner cavity 412a and an outer cavity 412c. In some embodiments, one or more of the cavities 412 may be partitioned or divided into parts or cavity regions 412 by a dividing wall or barrier 414. For instance, in the illustrative embodiment of FIG. 2C the inner cavities 412a are divided into two substantially equal parts by a dividing barrier 414.

Figure 2D:
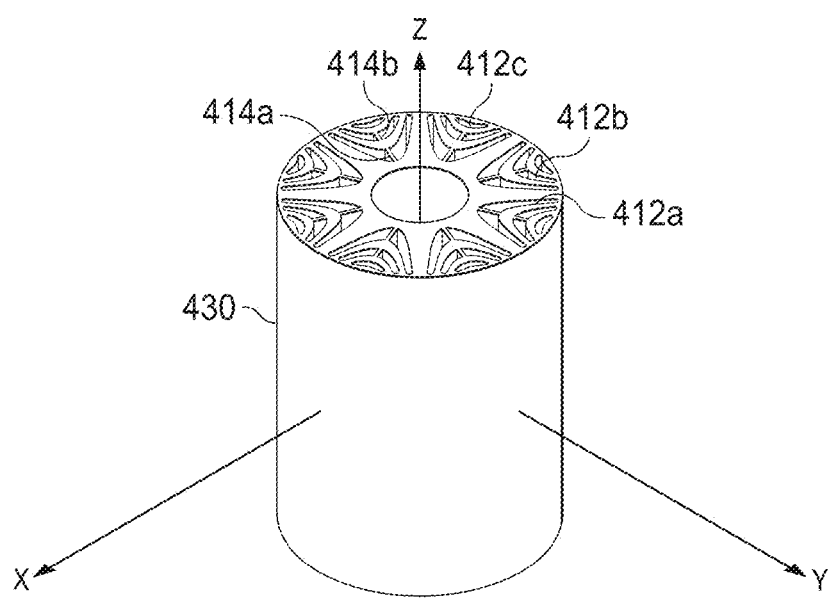
FIG. 2D is an isometric view of yet another embodiment of an inner rotor core of the Reluctance Synchronous Motor.

FIG. 2D is an isometric view illustrating yet another embodiment of an inner rotor core 410 of the RSM 400. In the illustrative embodiment of FIG. 2D the shape of the cavities 412 in each portion of the inner rotor core 410 is analogous or similar to an elliptical segment. As illustrative there is an inner cavity 412a, a middle cavity 412b, and an outer cavity 412c. In some embodiments, one or more of the cavities 412 may be partitioned or divided into parts or cavity regions by a dividing barrier 414. For instance, in the illustrative embodiment of FIG. 2D the inner cavities 412a and the middle cavities 412b are divided into two substantially equal parts by dividing barriers 414. In an alternative embodiment, there may be an inner cavity barrier 414a, a middle cavity barrier 414b, and an outer cavity barrier 414c. In various embodiments, the number of barriers 414 may vary from 1 to 3 on the inner rotor core 410, the outer rotor core 430, and the axial rotor cores 420 and 440.

Figure 2E:
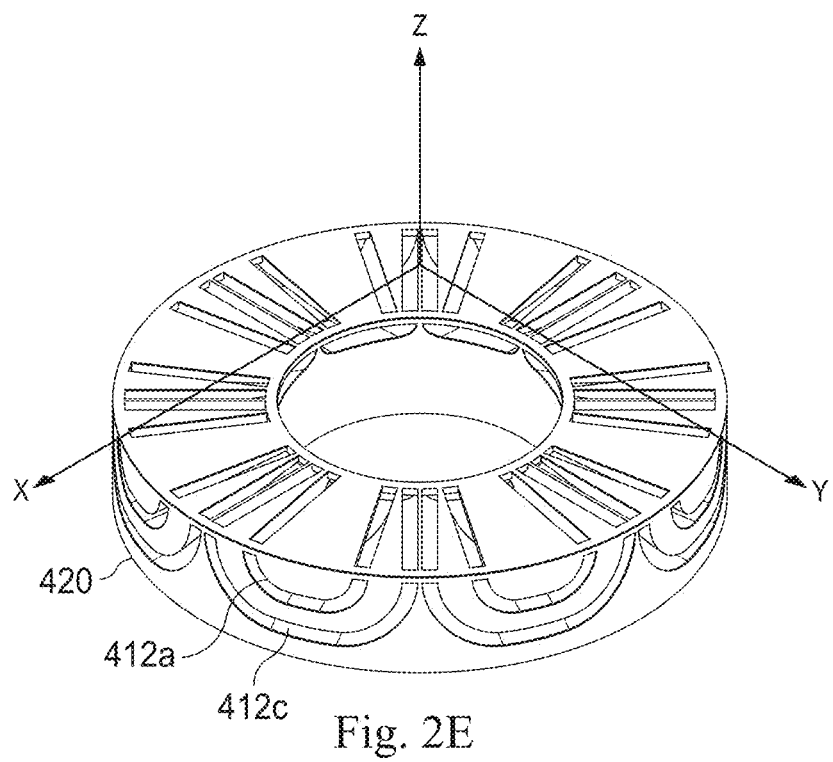
FIG. 2E is an isometric view illustrating a first axial rotor core of the Reluctance Synchronous Motor.

FIG. 2E is an isometric view illustrating a first axial rotor core 420 of the RSM 400. In some embodiments, the first axial rotor core 420 may comprise a solid core of iron or back iron so the first axial rotor core 420 will act as a magnetic flux field concentrator. In certain embodiments, the first axial rotor core 420 may be configured to optimize the FDD in the first axial rotor core 420 of an electric machine 10. For instance, the first axial rotor core 420 may use flux-shaping cavities 412 or slots to configure the FDD in the first axial rotor core 420 of the electric machine 10. In some embodiments, the flux shaping cavities 412 in the first axial rotor core 420 may configure a 2D magnetic flux field of an electric machine 10, such that the FDD is increased. In certain embodiments, the flux shaping cavities 412 in the first axial rotor core 420 may configure a 3D magnetic flux field in an electric machine 10, such that the FDD is increased. In one embodiment, the inner rotor core 410 of the RSM 400 may be a laminated inner rotor core 410.

In the illustrative embodiment of FIG. 2E the shape of the cavities 412 in each portion of the first axial rotor core 420 is analogous or similar to an elliptical segment. As illustrative there is an inner cavity 412*a* and an outer cavity 412*c*. In an alternative embodiment, there may be an inner cavity 412*a*, a middle cavity 412*b*, and an outer cavity 412*c*. In some embodiments, there may be single barrier 414, for instance an inner barrier 414*a*. In certain embodiments, there may be two barriers 414, for instance there may be an inner barrier 414*a* and an outer barrier 414*c*. In one embodiment, there may be three barriers 414, that is, an inner barrier 414*a*, middle barrier 414*b*, and outer barrier 414*c*. In another embodiment, there may be more than one barrier 414 in a cavity 412.

Figure 2F:
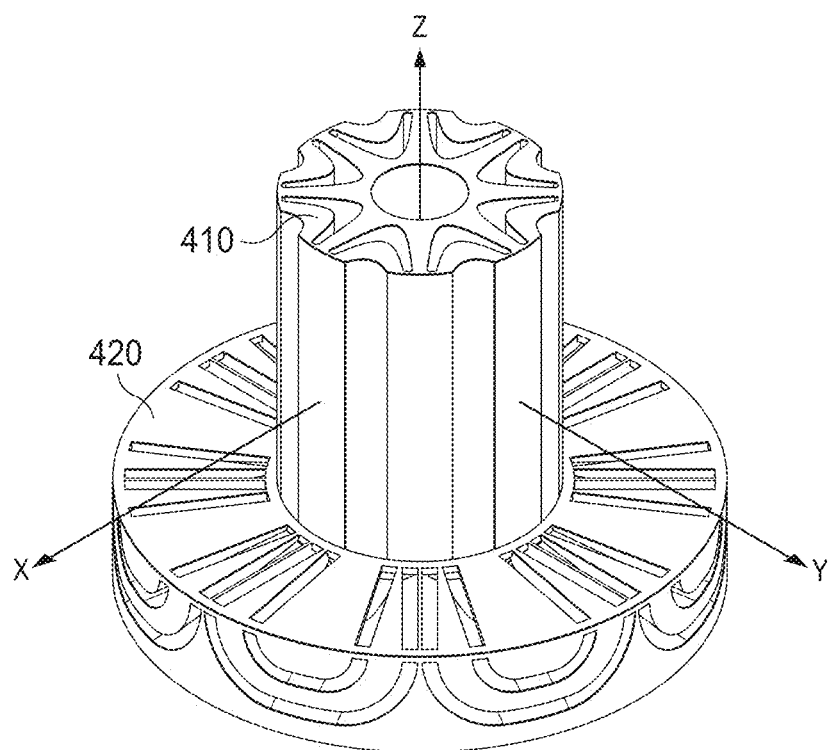
FIG. 2F is an isometric view illustrating the first axial rotor core assembly of FIG. 2E coupled to the inner rotor core assembly of FIG. 2B.

FIG. 2F is an isometric view illustrating the first axial rotor core 420 of FIG. 2E coupled to the inner rotor core 410 of FIG. 2B.

Figure 3A:
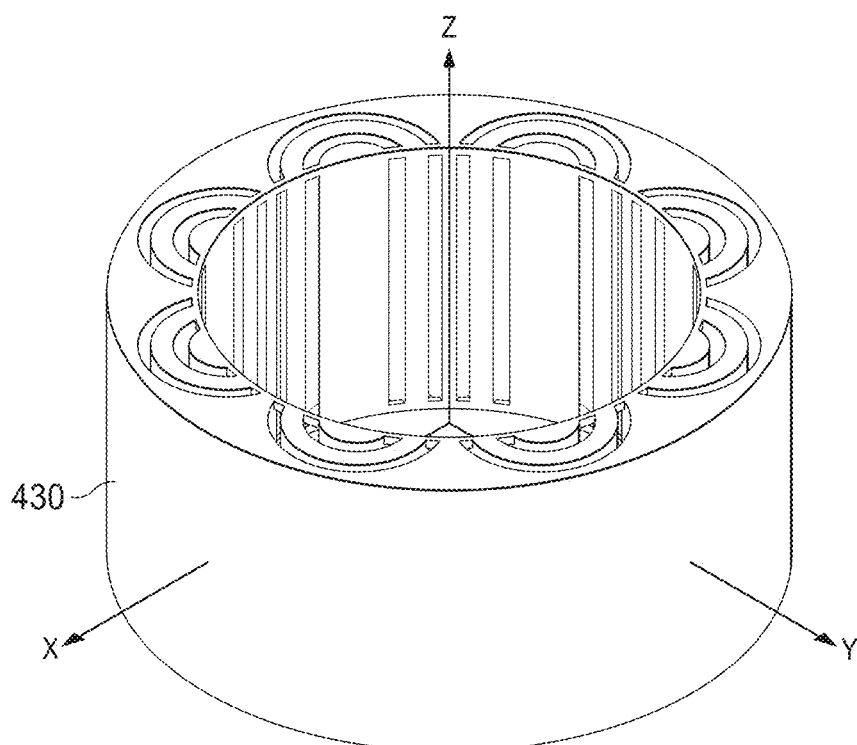
FIG. 3A is an isometric view illustrating an outer rotor of the Reluctance Synchronous Motor

FIG. 3A is an isometric view illustrating an outer rotor core 430 of the RSM 400 In some embodiments, the outer rotor core 430 may comprise a solid core of iron or back iron so that the outer rotor core 430 will act as a magnetic flux field concentrator. In the illustrative embodiment of FIG. 3A the shape of the cavities 412 in each portion of the outer rotor core 430 is analogous or similar to an elliptical segment. As illustrative there is an inner cavity 412*a* and an outer cavity 412*c*. In an alternative embodiment, there may be an inner cavity 412*a*, a middle cavity 412*b*, and an outer cavity 412*c*. In one embodiment, there may be single barrier 414, for instance an inner barrier 414*a*. In another embodiment, there may be two barriers 414, for instance there may be an inner barrier 414*a* and an outer barrier 414*c*. In yet another embodiment, there may be three barriers 414, that is, an inner 414*a*, a middle barrier 414*b*, and an outer barrier 414*c*. In an alternative embodiment, there may be more than one barrier 414 in a cavity 412.

Figure 3B:
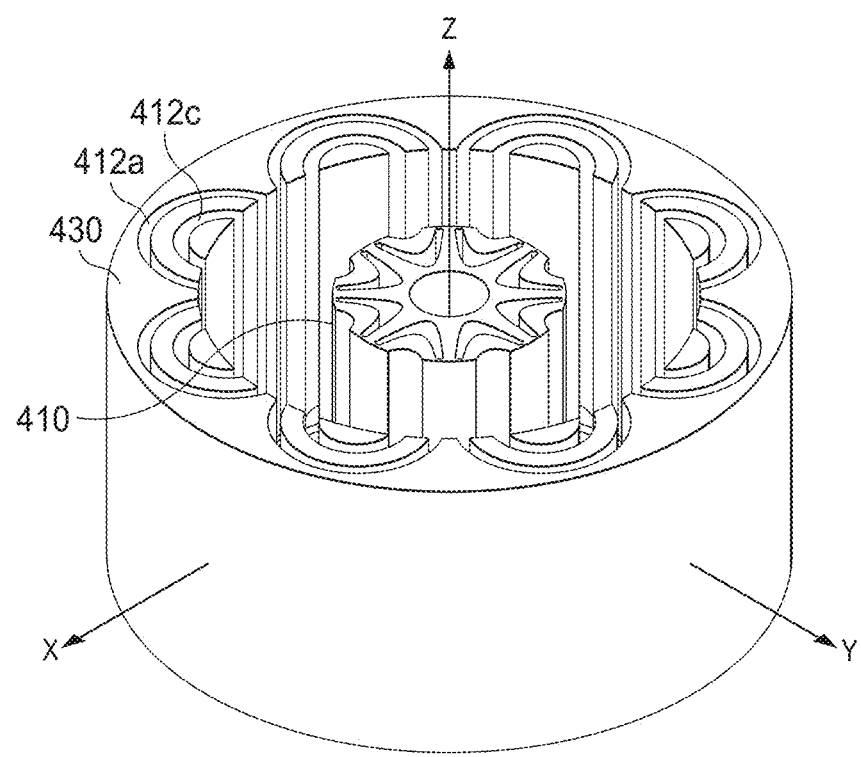
FIG. 3B is an isometric view illustrating a Reluctance Synchronous Motor having an outer rotor coupled to an inner rotor.

FIG. 3B is an isometric view illustrating a RSM 400 having an outer rotor core 430 adjacent to an inner rotor core 410. That is, FIG. 3B illustrates the rotor assembly of a new class of Reluctance Synchronous Motor, a Double Rotor-Reluctance Synchronous Motor (DRRSM) having a single coil winding assembly 500. Specifically, a double rotor axial-flux reluctance synchronous motor, which may be ideal for applications where the total length is constrained, like a direct drive hub motor.

In some embodiments, a double rotor configuration may achieve a greater maximum phase flux linkage (λmax) for a given volume than a conventional RSM. A double rotor configuration may therefore be a more efficient configuration in terms of torque and motor efficiency compared to a convention RSM. Another advantage of having multiple rotors, be it two, three, or four, is that their higher inertia makes them better suited for pulsating loads, such as reciprocal compressors. The effect of having multiple rotors on flux linkage, magnetic saturation, flux density, and torque may be studied using finite element analysis.

Figure 3C:
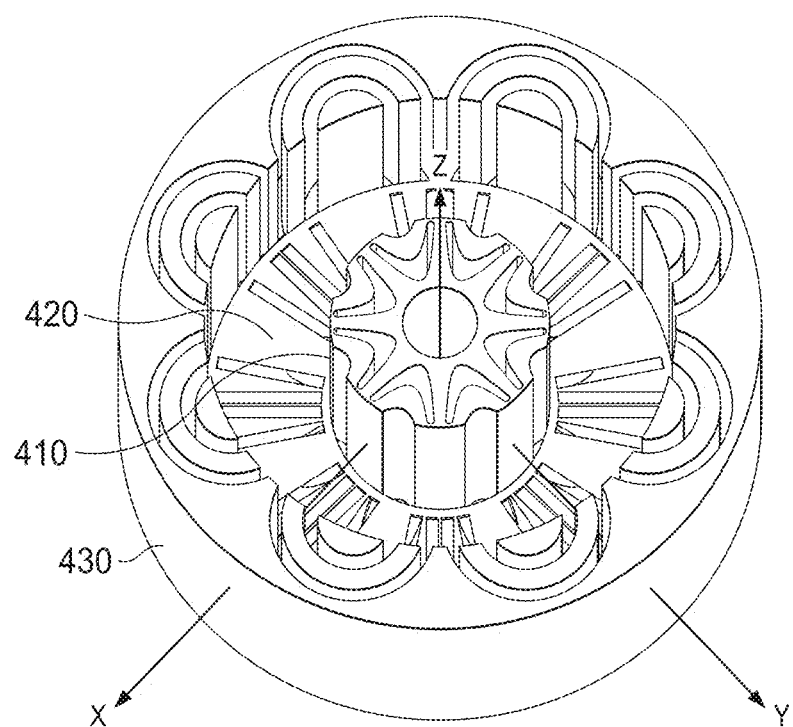
FIG. 3C is an isometric view illustrating the first axial rotor core and inner rotor core assembly of FIG. 2F coupled to the outer rotor core of FIG. 3A.

FIG. 3C is an isometric view illustrating the first axial rotor core 420 and inner rotor core 410 of FIG. 2F coupled to the outer rotor core 430 of FIG. 3A. That is, FIG. 3C illustrates the rotor assembly of a new class of RSM 400, a Triple Rotor-Reluctance Synchronous Motor (TRRSM) having a single coil winding assembly 500. A triple rotor configuration offers advantages over a conventional RSM motor in terms of torque and motor efficiency.

Figure 3D:
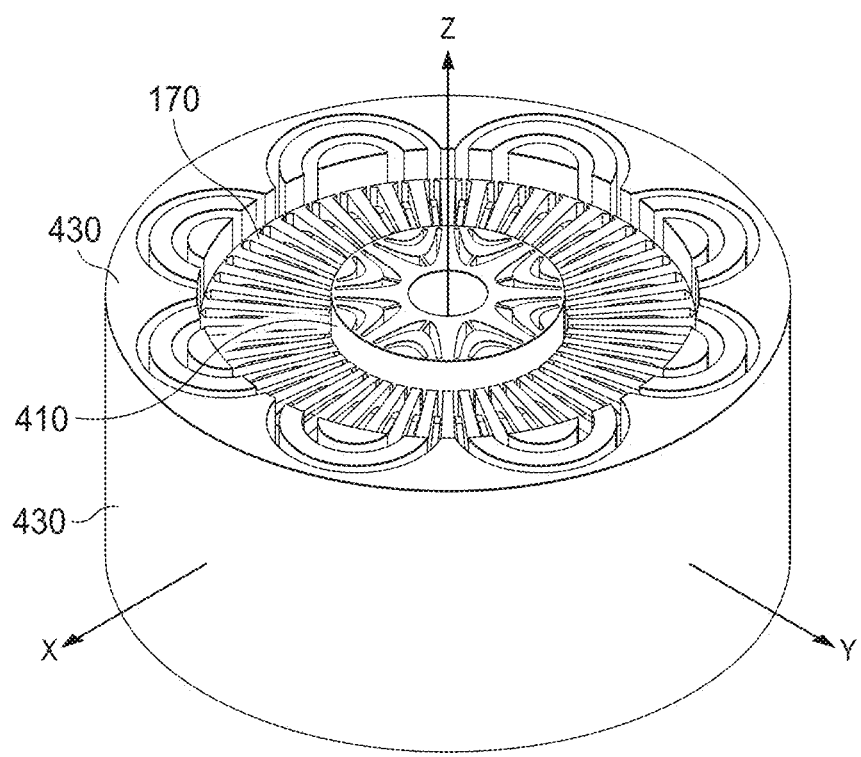
FIG. 3D is an isometric view illustrating the coil winding assembly within the assembly of FIG. 3C.

FIG. 3D is an isometric view illustrating the coil winding assembly 500 of a stator within the rotor assembly of FIG. 3C.

Figure 3E:
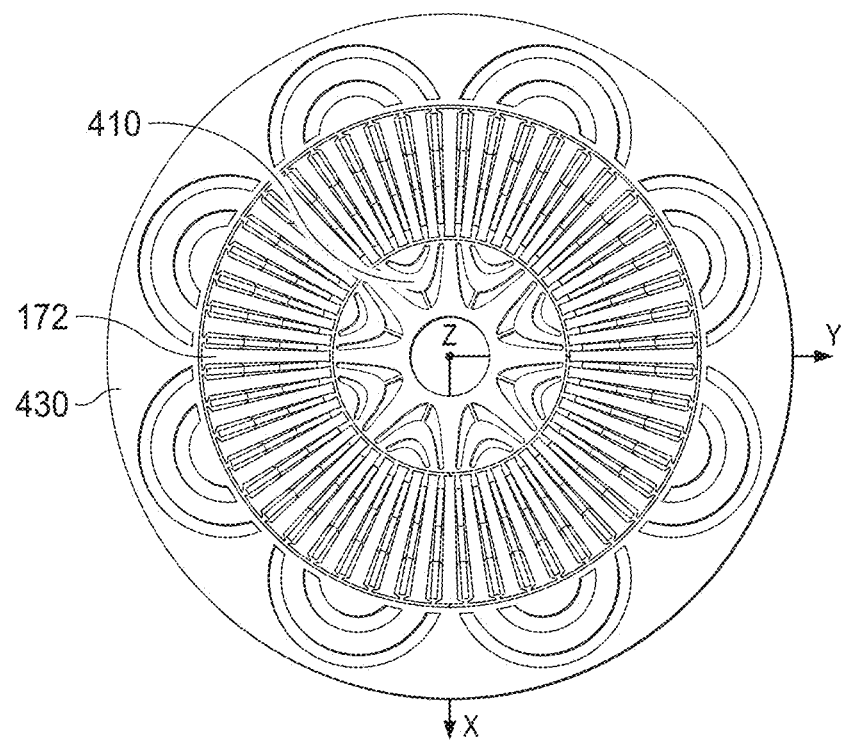
FIG. 3E is a top view of the Reluctance Synchronous Motor assembly of FIG. 3C having the inner rotor assembly of FIG. 2B.

FIG. 3E is a top view illustrating the RSM assembly of FIG. 3C having the inner rotor core 410 configuration of FIG. 2B.

Figure 3F:
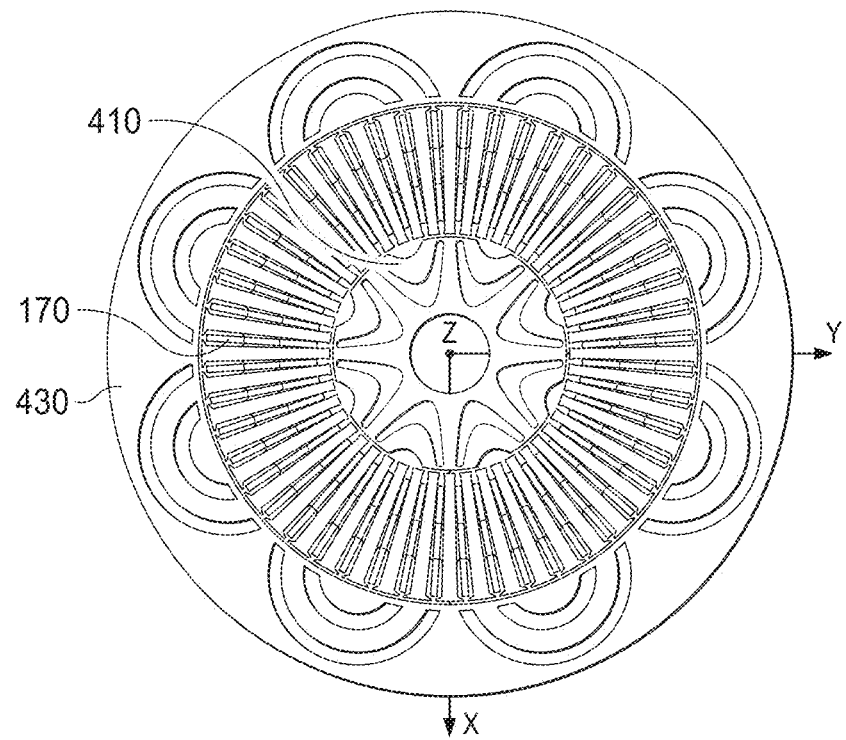
FIG. 3F is a top view of the Reluctance Synchronous Motor assembly of FIG. 3C having the inner rotor assembly of FIG. 2C.

FIG. 3F is a top view illustrating the RSM assembly of FIG. 3C having the inner rotor core 410 configuration of FIG. 2C.

Figure 3G:
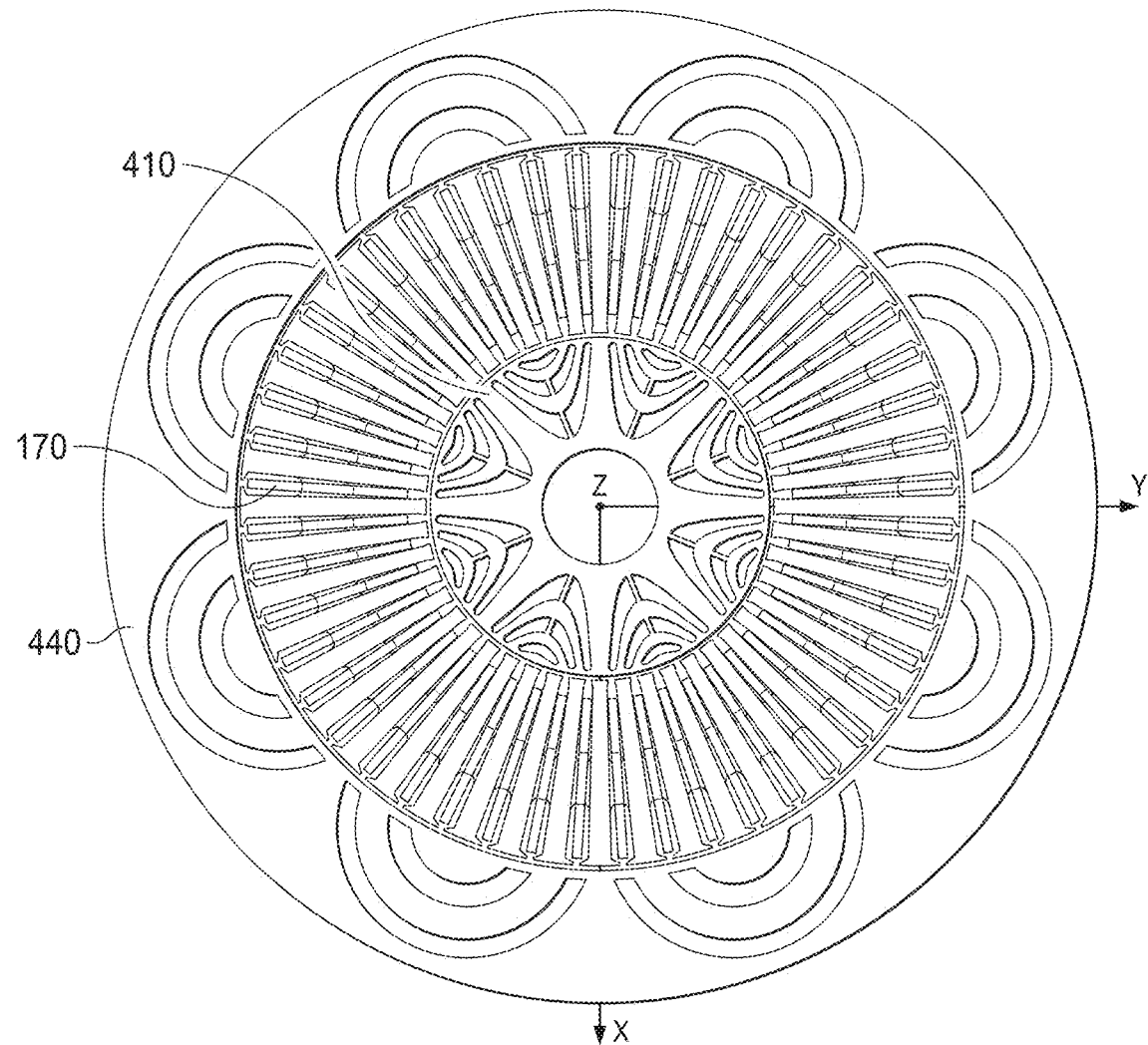
FIG. 3G is a top view of the Reluctance Synchronous Motor assembly of FIG. 3C having the inner rotor assembly of FIG. 2D.

FIG. 3G is a top view illustrating the RSM assembly of FIG. 3C having the inner rotor core 410 configuration of FIG. 2D.

Referring once more to the embodiment of FIG. 2A. FIG. 2A is an isometric view of a RSM 400 according to the principles of the present invention having four rotors. That is, FIG. 2A illustrates a new class of RSM 400, a Quadruple-Rotor Reluctance Synchronous Motor (QRRSM), having a single coil winding assembly 500. A quadruple rotor configuration offers advantages over a conventional RSM in terms of torque and motor efficiency.

In some embodiments, the first axial rotor core 420 and the coil winding assembly 500 are configured to minimize an airgap between the first axial rotor core 420 and the coil winding assembly 500. In certain embodiments, the axial rotor cores 420 and 440, and the coil winding assembly 500 are configured to minimize the airgaps between the axial rotor cores 420 and 440, and the coil winding assembly 500. In some embodiments, the outer rotor core 430 and the coil winding assembly 500 are configured to minimize an airgap between the outer rotor core 430 and the coil winding assembly 500. In certain embodiments, the outer rotor core 430, the inner rotor core 410, and the coil winding assembly 500 are configured to minimize the airgaps between the outer rotor core 430 and the coil winding assembly 500 and between the inner rotor core 410 and the coil winding assembly 500.

In some embodiments, a Reluctance Synchronous Machine (RSM) 400 may include a magnetic toroidal cylinder having an inner rotor core 410, a first axial rotor core, and a second axial rotor core 440, and the core assemblies may comprise a plurality of flux shaping cavities 412 configured to focus the Flux Density Distribution within each of the core assemblies. The first axial rotor is attached at an inner edge to one end of the inner rotor core 410 and the second axial rotor core 440 is attached at an inner edge to the other end of the inner rotor core 410 thereby forming a three sided reluctance torque tunnel comprising at least a first reluctance tunnel segment and a second reluctance tunnel segment. A coil winding assembly 500 having a plurality of coils 526 is positioned within the magnetic toroidal cylinder. The coil winding assembly 500 is configured so that there is at least one coil 526 within each of the reluctance tunnel segments.

In certain embodiments, the magnetic toroidal cylinder 100 of the RSM 400 may further include an outer rotor core 430 having a plurality of flux shaping cavities 412 configured to focus the FDD in the outer rotor core 430. One end of the outer rotor core 430 is joined to an outer edge of the first axial rotor core 420 and the other end of the outer rotor core 430 is joined to an outer edge of the second axial rotor core 440 thereby forming a four sided reluctance torque tunnel having a plurality of reluctance tunnel segments. There may be an airgap between the outer rotor core 430 and the coil winding assembly 500 and the outer rotor core 430 may be constructed to minimize this air gap in order to improve the performance of the RSM 400. There may also be an airgap between the coil winding assembly 500 and the first axial rotor core 420 and the first axial rotor core 420 may be constructed to minimize this air gap as well. The coil winding assembly 500 may be positioned about the central longitudinal axis of the RSM 400 within the path of the rotor core assembles which are adapted to rotate about the central longitudinal axis. In one embodiment, the outer rotor may further define a transverse slot which allows a support for the coil winding assembly 500 to pass through the outer rotor.

In certain embodiments, the radial length of the inner face of the first axial rotor core 420 of the RSM 400 may be longer than the longitudinal length of an inner face of the inner rotor core 410. In other embodiments, the radial length of an inner face the first axial rotor core 420 may be shorter than the longitudinal length of an inner face of the inner rotor core 410. In one embodiment, the number of concentric flux shaping cavities 412 in a radial portion of the inner rotor core 410 may be different from the number of concentric flux shaping cavities 412 in a corresponding radial portion of the outer rotor core 430.

In certain embodiments, at least a portion of the inner rotor core 410 may comprise a number of concentric flux shaping cavities 412 and some of these cavities 412 may have an elliptical shape. Flux shaping cavities 412 may also form salient poles in the radial surface of the inner rotor core 410. The shape of the flux shaping cavities 412 in the inner rotor core 410 may be substantially two dimensional or three dimensional where some of the flux shaping cavities 412 are configured to focus the FDD either radially outwards or radially outwards.

Further, at least some of the flux shaping cavities 412 of the inner rotor core 410 may be partitioned into two substantially equal portions by a dividing wall. At least some of the flux shaping cavities 412 of the inner rotor core 410 may be substantially void or filled, in some instances partially, with a material, which based on the application may be a non-magnetic material or permanent magnetic material. In one embodiment, an outer portion of the inner rotor core 410 may form a segment of an elliptical cavity, while in another embodiment the surface of inner rotor core 410 may include a number of salient poles.

In certain embodiments, the inner rotor core 410 may be formed of laminated strips of grain-oriented electrical steel, which may be coated with an oxide layer, while in other embodiments the inner rotor core 410 may be formed of an isotropic ferromagnetic material which may be a soft magnetic composite material. The isotropic material may also be a ferromagnetic open cell metal foam material infused with a structural support matrix made of thermoset or a thermoplastic resin having a porosity between about 75% and about 95% by volume.

In some embodiments, a Reluctance Synchronous Machine (RSM) 400 may include a magnetic toroidal cylinder 100 having an inner rotor core 410, a first axial rotor core 420, and an outer rotor core 430, and the core assemblies may comprise a plurality of flux shaping cavities 412 configured to focus the Flux Density Distribution (FDD) within each of the core assemblies. The first axial rotor is attached at an inner edge to a first end of the inner rotor core 410 and at an outer edge to a first end of the outer rotor core 430 thereby forming a three sided reluctance torque tunnel comprising at least a first reluctance tunnel segment and a second reluctance tunnel segment. A coil winding assembly 500 having a plurality of coils 526 is positioned within the magnetic toroidal cylinder 100. The coil winding assembly 500 is configured so that there is at least one coil 526 within each of the reluctance tunnel segments.

In certain embodiments, the magnetic toroidal cylinder 100 of the RSM 400 may further include a second axial rotor core 440 having a plurality of flux shaping cavities 412 configured to focus the FDD in the second axial rotor core 440. The second axial core is joined at an inner edge to the second end of the inner rotor core 410 and at the outer edge to the second end of the outer rotor core 430 thereby forming a four sided reluctance torque tunnel having a plurality of reluctance tunnel segments. In one embodiment the longitudinal length of an inner face of the inner rotor core 410 is longer than a radial length of an inner face of the first axial rotor core 420.

In some embodiments, a Reluctance Synchronous Machine (RSM) 400 may include a magnetic toroidal cylinder 100 having an inner rotor core 410, a first axial rotor core 420, a second axial rotor core 440, and an outer rotor core 430, and the core assemblies may comprise a plurality of flux shaping cavities 412 configured to focus the Flux Density Distribution within each of the core assemblies. The inner rotor core 410 is attached at one end to an inner edge of the first axial rotor core 420 and at the other end to the inner edge of the second axial rotor core 440, the outer rotor core 430 is attached at one end to an outer edge of the first axial rotor core 420 and at the other end to an outer edge of the second axial rotor core 440 thereby forming a reluctance torque tunnel. The outer rotor core 430 may further define a transverse slot which allows a support for a stator placed within the reluctance torque tunnel to pass through the outer rotor. In certain embodiments, the outer edge of the first axial rotor core 420 and the first end of the outer core define the transverse slot.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

What is claimed is:

1. A switched reluctance machine comprising:
a toroidal cylinder arranged about a longitudinal axis and comprising:
an inner rotor core concentrically positioned about the longitudinal axis and comprising a plurality of flux shaping salient magnetic poles configured to concentrate flux linkage;
a first axial rotor core concentrically positioned about the longitudinal axis and comprising:
a plurality of flux shaping salient magnetic poles configured to concentrate flux linkage; and
a first axial rotor core inner edge positioned adjacent to a first end of inner rotor core;
a second axial rotor core concentrically positioned about the longitudinal axis comprising
a plurality of flux shaping salient magnetic poles configured to concentrate flux linkage; and a second axial rotor core inner edge positioned adjacent to a second end of the inner rotor core; and a coil winding assembly:
  positioned within the toroidal cylinder;
  comprising a plurality of coils;
  configured to locate a first or second reluctance tunnel segment of the toroidal cylinder surrounding at least one of the plurality of coils; and
  configured to rotate the inner rotor core, the first axial rotor core, and the second axial rotor core to minimize the reluctance of the switched reluctance machine when the plurality of coils of the coil winding assembly are energized.

2. The switched reluctance machine of claim 1, wherein the toroidal cylinder further comprises an outer rotor core comprising a plurality of flux shaping salient magnetic poles configured to concentrate flux linkage, the outer rotor core comprising a first end positioned adjacent to an outer edge of the first axial rotor core and comprising a second end positioned adjacent to an outer edge of the second axial rotor core, such that, the inner rotor core, the first axial rotor core, and the second axial rotor core forming a four sided reluctance torque tunnel comprising at least the first reluctance tunnel segment and the second reluctance tunnel segment.

3. The switched reluctance machine of claim 2, wherein the outer rotor core and the coil winding assembly are configured to minimize an air gap between the outer rotor core and the coil winding assembly.

4. The switched reluctance machine of claim 2, wherein the outer rotor core defines, at least in part, a transverse slot, and wherein the transverse slot allows a support for the coil winding assembly to pass through the outer rotor core.

5. The switched reluctance machine of claim 2, wherein the outer edge of the first axial rotor core and the first end of the outer core define a transverse slot.

6. The switched reluctance machine of claim 2, wherein a longitudinal length of an inner face of the inner rotor core is longer than a radial length of an inner face of the first axial rotor core.

7. The switched reluctance machine of claim 1, wherein a radial length of an inner face of the first axial rotor core is longer than a longitudinal length of an inner face of the inner rotor core.

8. The switched reluctance machine of claim 1, wherein the inner rotor core is constructed to comprise flux shaping salient magnetic poles and the coil winding assembly is constructed to comprise non-salient flux shaping magnetic poles.

9. The switched reluctance machine of claim 2, wherein the inner rotor core and the outer rotor core comprises the same number of flux shaping salient magnetic poles.

10. The switched reluctance machine of claim 1, wherein the rotor core comprises laminated strips of grain-oriented electrical steel coated with an oxide layer.

11. The switched reluctance machine of claim 1, wherein the rotor core comprises an isotropic ferromagnetic material.

12. The switched reluctance machine of claim 1, wherein the rotor core comprises an isotropic ferromagnetic material of a porosity between about 75% and about 95% by volume, wherein the ferromagnetic isotropic material is ferromagnetic open cell metal foam material infused with a structural support matrix made of thermoset or a thermoplastic resin.

13. The switched reluctance machine of claim 1, wherein the first axial rotor core and the coil winding assembly are configured to minimize an airgap between the first axial rotor core and the coil winding assembly.

14. A method of producing electric power with a switched reluctance machine comprising:
  positioning a toroidal cylinder about a central longitudinal axis of the switched reluctance machine, the toroidal cylinder forming a rotor core defined by:
    an inner rotor core comprising a plurality of flux shaping salient magnetic poles configured to concentrate flux linkage;
    a first axial rotor core comprising a plurality of flux shaping salient magnetic poles configured to concentrate flux linkage, the first axial rotor core comprising an inner edge positioned adjacent to a first end of inner rotor core; and
    a second axial rotor core comprising a plurality of flux shaping salient magnetic poles configured to concentrate flux linkage, the second axial rotor core inner edge coupled to a second end of the inner rotor core, the rotor core configured to rotate about the central longitudinal axis;
  positioning a coil winding assembly within the toroidal cylinder about the central longitudinal axis within a rotational path of the rotor core assemblies, the coil winding assembly comprising a plurality of coils;
  applying current to the plurality of coils in a sequence that continuously impacts torque to turn the rotor core in a desired direction, relative to the coil winding assembly, the rotor core configured to rotate to minimize the reluctance of the switched reluctance machine when the plurality of coils of the coil winding assembly are sequentially energized.

15. The method of claim 14, wherein the toroidal cylinder further comprises an outer rotor core comprising a plurality of flux shaping salient magnetic poles configured to concentrate flux linkage, the outer rotor core having comprising a first end coupled to an outer edge of the first axial rotor core and having a second end positioned adjacent to an outer edge of the second axial rotor core, such that, the rotor core forms a four sided reluctance torque tunnel comprising at least the first reluctance tunnel segment and the second reluctance tunnel segment.

16. The method of claim 15, wherein the outer rotor core and the coil winding assembly are configured to minimize an air gap between the outer rotor core and the coil winding assembly.

17. The method of claim 15, wherein the outer rotor core defines, at least in part, a transverse slot, and wherein the transverse slot allows a support for the coil winding assembly to pass through the outer rotor core.

18. The method of claim 14, wherein the first axial rotor core and the coil winding assembly are configured to minimize an airgap between the first axial rotor core and the coil winding assembly.

19. The method of claim 15, wherein the outer rotor core and the coil winding assembly are configured to minimize an airgap between the outer rotor core and the coil winding assembly.

20. An electric machine comprising:
  a first axial rotor core:
    arranged about a motor axis; and
    comprising a first set of arched magnetic elements configured to induce flux linkage about the first axial rotor core;
  a second axial rotor core:
    arranged about the motor axis and opposite the first axial rotor core; and comprising a second set of arched magnetic elements configured to induce flux linkage about the second axial rotor core;

an inner rotor core:
  arranged about a rotor axis and interposed between the first axial rotor core and the second axial rotor core;
  comprising an inner set of arched magnetic elements configured to induce flux linkage about the inner rotor core; and
  cooperating with the first axial rotor core and the second axial rotor core to form a cylindrical tunnel; and a set of coil assemblies:
  arranged within the cylindrical tunnel; and
  configured to inductively couple the inner rotor core, the first axial rotor core, and the second axial rotor core to rotate the cylindrical tunnel about the rotor axis.

* * * * *